United States Patent
Yen et al.

(10) Patent No.: US 10,652,792 B2
(45) Date of Patent: May 12, 2020

(54) METHODS AND SYSTEMS FOR CARRIER-ASSISTED USER INFORMATION RETRIEVAL FROM MOBILE DEVICES

(71) Applicant: T-Mobile USA, Inc., Bellevue, WA (US)

(72) Inventors: Leon Chung-Dai Yen, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 3 days.

(21) Appl. No.: 16/017,615

(22) Filed: Jun. 25, 2018

(65) Prior Publication Data
US 2019/0394692 A1    Dec. 26, 2019

(51) Int. Cl.
*H04W 36/00*    (2009.01)
*H04W 36/04*    (2009.01)

(52) U.S. Cl.
CPC ....... *H04W 36/04* (2013.01); *H04W 36/0055* (2013.01)

(58) Field of Classification Search
CPC .......................... H04W 36/04; H04W 36/0055
See application file for complete search history.

(56) References Cited

U.S. PATENT DOCUMENTS

| 2010/0318417 | A1* | 12/2010 | Brisebois | G06Q 20/202 705/14.37 |
| 2011/0225047 | A1* | 9/2011 | Breed | G06Q 30/02 705/14.55 |
| 2015/0055623 | A1* | 2/2015 | Li | H04W 40/04 370/331 |
| 2015/0312348 | A1* | 10/2015 | Lustgarten | H04L 67/12 705/14.66 |
| 2016/0021582 | A1* | 1/2016 | Yu | H04W 48/18 455/436 |

* cited by examiner

*Primary Examiner* — Joseph E Dean, Jr.
(74) *Attorney, Agent, or Firm* — Lee & Hayes, P.C.

(57) ABSTRACT

Systems and methods for automatically recognizing a user equipment (UE) associated with a person who enters a storefront are disclosed. A modified small cell (such as a femtocell or picocell) extracts, from a request to register or initiate a handover procedure, information identifying the user equipment (e.g., IMEI) and information indicating the identity of a user profile associated with the user equipment (e.g., IMSI). The IMEI and IMSI may be used to query a mobile carrier Home Subscriber Service (HSS) database to obtain customer information associated with the IMEI and IMSI data. The customer information may be used to query a database of the storefront to generate inventory information, such as promotional information or other marketing or sales information, which may be transmitted to the user equipment for display.

20 Claims, 18 Drawing Sheets

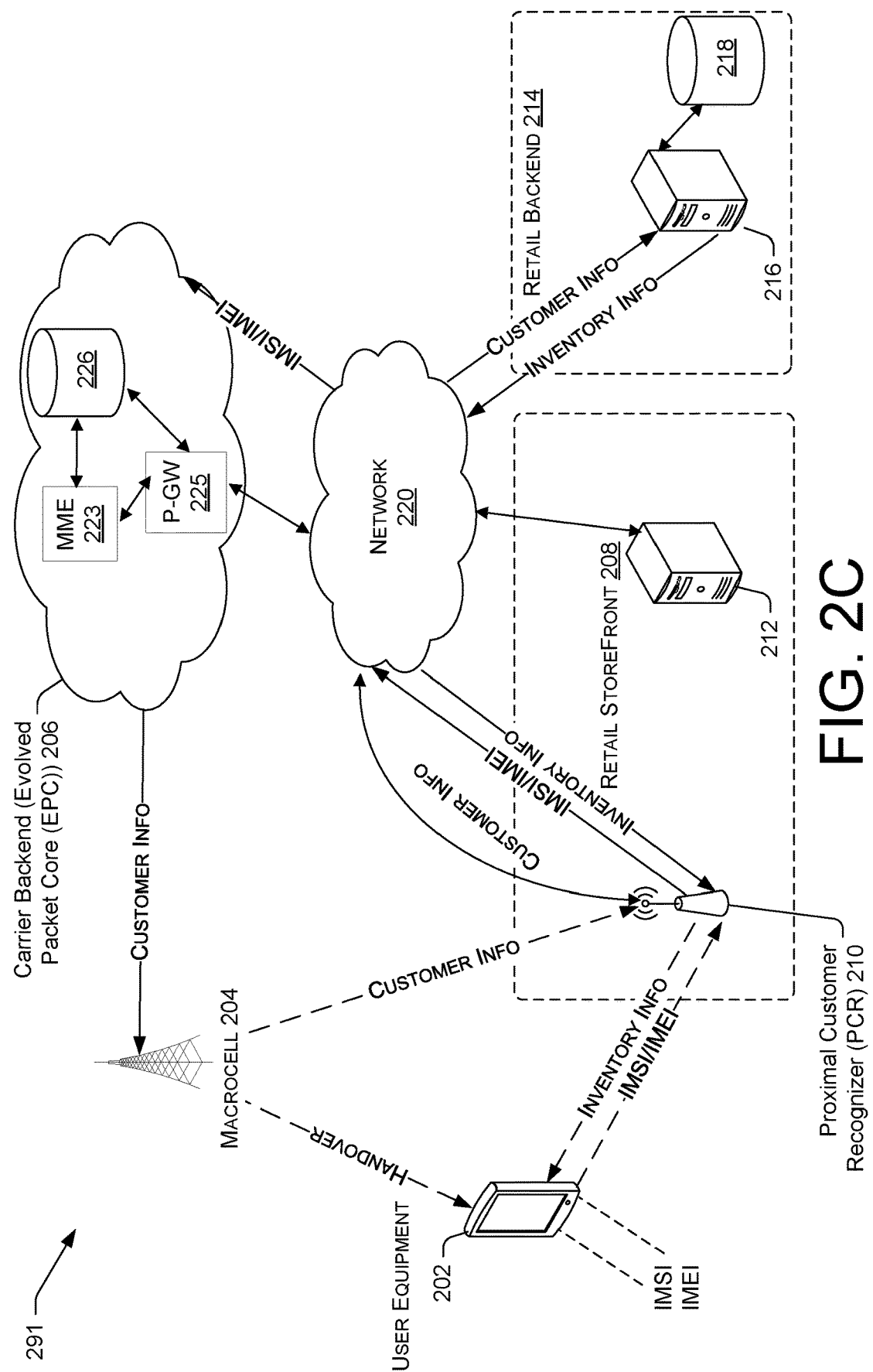

METHODS AND SYSTEMS FOR CARRIER-ASSISTED USER INFORMATION RETRIEVAL FROM MOBILE DEVICES

BACKGROUND

Mobile communication devices such as smartphones, tablet computers, wearable devices, and the like are widely used and carried by consumers. Besides placing voice calls, sending messages, or browsing the Internet, these devices are being used for obtaining information about consumer products and paying for consumer purchases. The mobile devices include wireless interfaces such as cellular, Wi-Fi, and Global Positioning Services (GPS) that can provide location information of the device. Cellular-based location information generated from communications with a macrocell generally does not provide precise location information of a mobile device. Additionally, location information of a mobile device does not provide historical or demographic information for a mobile device or its users.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2C illustrates an example system for automatically recognizing customers in a storefront in which the Proximal Customer Recognizer transmits IMSI and IMEI data to the carrier backend system (Evolved Packet Core or EPC) via a non-macrocell network.

FIG. 5 depicts operations performed by a Proximal Customer Recognizer in response to receiving customer information from a mobile carrier computer system, and an operation performed by the retail storefront in response to receive customer information from the Proximal Customer Recognizer.

FIG. 7 depicts the retail storefront receiving customer promotion information, and forwarding that information to a Proximal Customer Recognizer. The Proximal Customer Recognizer forwards the customer promotion to the customer UE for display.

DETAILED DESCRIPTION

Figure 1:
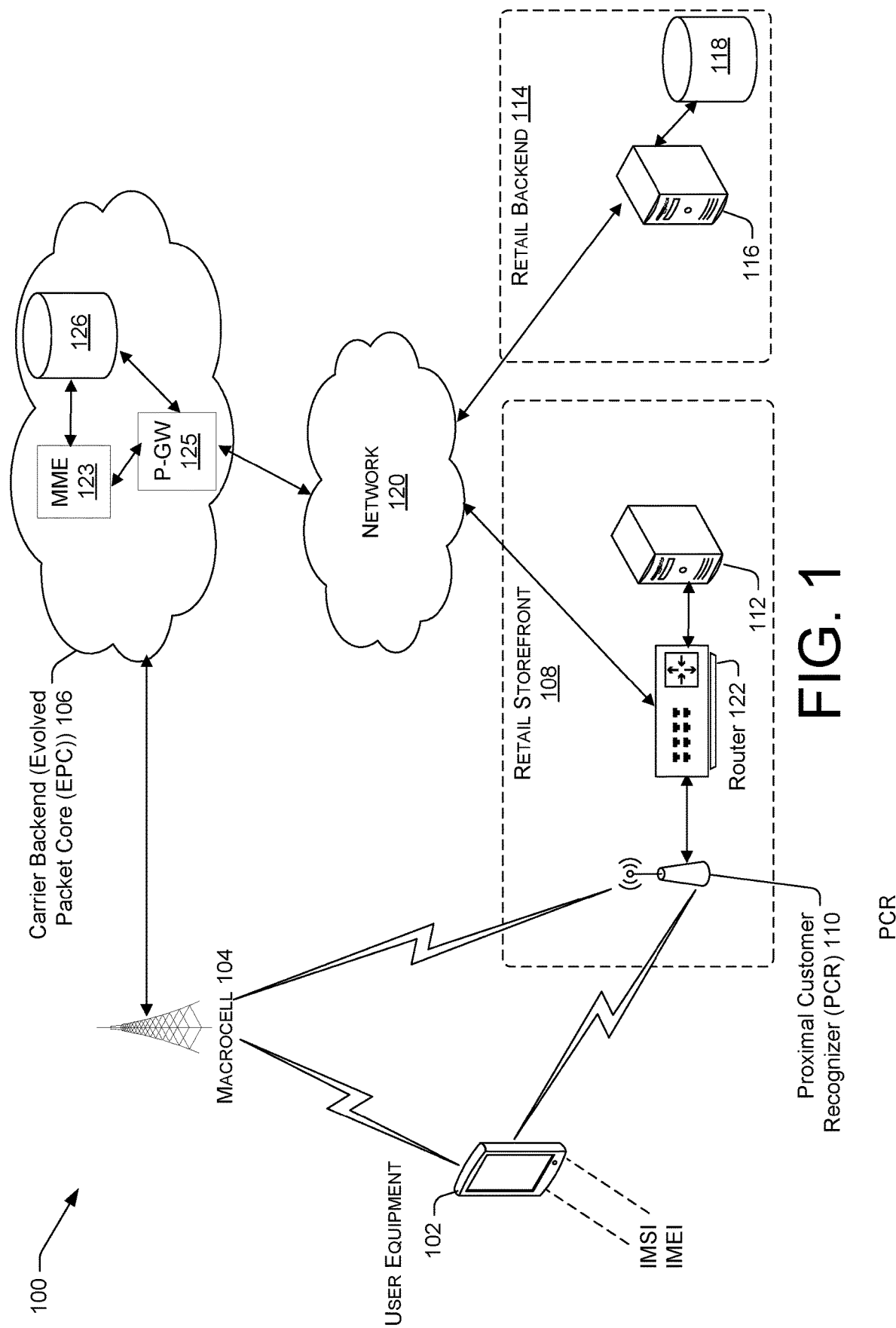
FIG. 1 is an illustrative environment depicting a system for automatically recognizing customers as they enter a storefront.

Described herein are technologies for systems and methods for using a small cell (e.g., femtocell or picocell access points) to automatically recognize a user equipment (UE), e.g., a mobile device, located in close proximity to the small cell. The small cell may be placed in any location that is expected to include consumers with mobile devices. Example locations may include a store front, a vending machine, a kiosk, a shopping mall, a grocery store, a consumer store, a restaurant, or any other location that is expected to include people carrying a mobile device. Each of these locations may have associated computer systems that maintain a customer account database storing information about purchasing history of its respective customers. This customer account database may include past, present, and future purchasing information of a customer.

Upon entering the radio coverage of a small cell, a user equipment (UE) may attempt to register with the small cell. The UE may also attempt to initiate a handover process to handover connection of the mobile device from a macrocell to the small cell. During the registration or handover process, the small cell may obtain data indicating an identity of the customer (e.g., IMSI) and device (e.g., IMEI) for use in querying a mobile carrier's home database to obtain additional information about the user of the UE or mobile device. It is understood that an IMSI refers to an indication of an identity of a user of a UE or an indication of an identity of a customer profile of the user of a UE. The customer information received from a mobile carrier's database may be compared with customer account information generated by the store front hosting the modified small cell to generate promotional and marketing or sales information for transmission to the UE of the user (or customer) for purchase by the user. In some examples, the promotional or marketing or sales information may relate to services for purchase by the user. The promotional or marketing or sales information may be generated to obtain more loyal customers purchasing goods and services from the storefront maintaining the customer account database.

In some examples, a person carries user equipment (UE) such as a mobile phone that is generally connected to a macrocell in a macrocell network, unless the macrocell hands over connection of the UE to a small cell network. The small cell network may be a low-powered radio access node having a range of a few meters to about a mile in diameter. A small cell wireless network may include one or more small cells such as a femtocell or picocell. The small cell wireless network may include a microcell.

A storefront may deploy one or more modified small cells (or Proximal Customer Recognizers (PCR)) in its premises to detect the presence of UE according to the disclosed systems and methods. For example, as a potential customer and associated mobile device (e.g. user equipment (UE)) moves within the radio range of a small cell in a storefront, the UE may attempt to register with the small cell or may attempt to initiate a handover process to transfer control of cellular communications with the UE from the macrocell to the small cell. As part of the registration or handover process, the user equipment may transmit a message that includes an International Mobile Subscriber Identity (IMSI) and an International Mobile Equipment Identity (IMEI) to the small cell. An IMSI identifies the subscriber identify module (SIM) card of the user device, and is typically stored in the SIM card. In other examples, a universal subscriber identity module (USIM) may be included in the request. In an example, an embedded SIM card (eSIM) may be used. A SIM card, an eSIM, and a USIM are understood to be interchangeable for the purposes of this disclosure. The IMSI provides data that is indicative of the SIM card, and thus the user of the user equipment. An IMEI identifies an associated user equipment and is typically stored in the memory (or firmware) of the mobile device. The IMEI provides information indicative of the mobile device, and is typically independent of the IMSI or the user of the user device.

During the handover process (or an initial registration attempt), the small cell may obtain IMSI and IMEI data of the UE. After obtaining the IMSI and/or IMEI data, the small cell may query the carrier backend network using the IMSI and/or IMEI data to obtain customer information maintained by the carrier Home Subscriber Service (HSS) of the carrier backend system. In some examples customer information stored in the carrier HSS may include a name, address, phone number, birthday, email account, voice and/or data plan, payment history, device model, device status, device usage, or any other information stored as part of a customer profile. In one example, the small cell may query the HSS of the carrier backend via the Internet to obtain customer information. In another example, the small cell may leverage the carrier radio access network of the macrocell to obtain customer information stored in the HSS database of the carrier backend system.

In one example, for an inbound small cell handover procedure, the user equipment may transmit various information when attempting to register onto the carrier LTE network. This process is called the "initial attach." During the initial attach, the customer UE may transmit handover information to the small cell (PCR) located in the retail storefront. The handover information may include information identifying the customer (e.g., IMSI data) and the user equipment (e.g., IMEI data). Additional data may also be transferred to the PCR during the handover process.

Upon receiving the handover information, the PCR may extract the IMSI and IMEI data from the initial attach request. In one example, the PCR may extract the IMSI and IMEI data directly from the request. The messages including the IMSI and IMEI may be encrypted and decrypted according to 3GPP standards to prevent disclosure of the IMSI and IMEI data.

In an example, after obtaining the IMSI and IMEI data, the PCR may provide the IMSI and IMEI data to the carrier backend system for use in a query. The carrier backend may query a carrier backend database (e.g., a home subscriber server or HSS) using the IMSI and/or IMEI data to retrieve customer information. In another example, the carrier backend database may query a home location register (HLR) database in a GSM network. In one example, the customer information may be included in a customer profile stored in the HSS of the carrier backend system. The PCR may transmit a request that includes the IMSI and IMEI to the macrocell or the carrier backend system to obtain customer information. One example carrier backend system is an Evolved Packet Core (EPC). The customer profile may include one or more of the following types of information: name, address, phone number, birthday, email account, voice and/or data plan, payment history, device model, device status, device usage, or any other information stored by the carrier as part of the customer profile. The customer profile information retrieved from the HSS may be returned to the PCR.

The PCR may use the customer profile information received from the carrier HSS database to obtain, from a database of the storefront, information specific to the customer. In one example, the PCR transmits the returned customer information to a retail storefront computer in a request. The retail storefront computer may receive the message and transmit the message with the returned customer information to a retail backend system. The returned customer information may be used to query a database accessed by the retail backend system to obtain additional information specific to the customer. In other examples, the retail storefront may directly query a database to obtain customer information. In these types of examples, the PCR may query the store front database to obtain customer account information. Some examples of customer account information include a corresponding customer membership identification, shopping preferences, any pending reservations or purchases, a history of past transactions, outstanding customer account balance, payment history, or departments in which the customer purchased products or services.

The backend retail database may store customer profiles for the customers of the retail storefront. A customer profile may include, for example, the purchasing history of the customer in the retail store. The purchasing history may include or represent a statistical analysis of the purchasing history reflecting the likelihood of a customer purchasing a product in each department. In some examples, the information stored in the retail database may be used to determine additional products or services that the retail store may want to offer to the customer. For example, the retail store may offer products for purchase in addition to, or in lieu of, the products that a customer may be considering for purchase.

In other examples, the returned customer information may indicate a customer whose profile is not included in the retail backend system. This may occur, for example, if the customer has not previously purchased a product or service from the retail store. Additionally, the retail database may identify customers who have previously visited the store, but have not previously purchased a product or service from the store. A store may also identify customers who have not previously purchased a product from its store (or who is a first-time visitor to the store), and send promotions to those users to potentially create a customer relationship for future purchasing.

Based upon the analysis of the respective customer profile stored in the retail database, the retail backend may identify inventory information, such as promotional information, marketing information, items, deals, or sale items, to transmit to the customer's user device for purchase by the user. This inventory information may be transmitted from the retail backend computer system, to the retail storefront computer system, and to the PCR. In other examples, the inventory information may be transmitted from the retail backend computer system to the PCR without going through the retail storefront computer system. In other examples, the inventory information may be transmitted from the store front to the PCR. The PCR may transmit the inventory information, such as promotional information, marketing information, items, deals, or sales items, to the customer user device.

In an example, a retail database may store customer account information indexed or accessible by IMEI and/or IMSI data. In this case, the PCR may obtain customer account information from a retail store database by querying that database with the extracted IMEI and IMSI data. In an example, the retail database may be associated with a retail store of a mobile carrier. In an example, the retail database may be associated with a retail store separate from or not associated with a retail store of a mobile carrier. The retail store database may be a database that is accessible by the retail store front or the retail backend. For example, the database accessible by IMEI and IMSI data may be controlled by the retail storefront or the retail storefront backend computer system. The database accessible by IMEI and IMSI data may be a third-party database that may be queried by the retail storefront using the IMEI and IMSI data.

The disclosed systems and methods may be implemented in a PCR by modifying or adding software functionality to small cells. The functionality may include computer instructions to extract the IMSI and IMEI data, to obtain customer account information associated with the IMSI and IMEI data, and to transmit the inventory information and items, such as promotional information, sales items, and marketing deals, to a customer based, in part, on customer account information.

The disclosed systems and methods may be implemented by a PCR small cell access point that does not carry handover traffic. In this case, the PCR small cell is configured to extract IMSI and IMEI data from a UE registration request. After obtaining the IMSI and IMEI data, the small cell PCR functions as described above, namely it obtains customer account information associated with the IMSI and IMEI data, and transmits inventory information, such as promotional information, marketing information, items, sales items, and marketing deals, to a customer based upon the customer account information.

The techniques and systems described herein may be used in numerous locations for providing information to user devices. For example, a small cell may be located in a kiosk or vending machine to provide information or inventory to relevant users in close proximity to the kiosk or vending machine. In another example, a small cell may be placed in secure locations such as airport security or airport boarding to identify users for controlling access to secure locations.

The techniques and systems described herein provide numerous improvements to the functioning of the computer. For example, the PCR small cell automatically identifies customers who possess a device capable of cellular communications. The PCR small cell may improve existing carrier network functionality by communicating directly with a macrocell on a backend system of a carrier (such as an Evolved Packet Core) to access customer information that may be used for additional queries to obtain information specific to a customer account. Furthermore, the techniques and systems described herein seamlessly provide associated product information that may be important to a user. The disclosed systems and methods also provide an improvement to the computer system by reducing the hardware, memory requirements, and power requirements. Additionally, the disclosed systems reduce database complexity by leveraging the information in the carrier database to use as query keys. The disclosed systems and methods may be implemented in a number of ways. Example implementations are provided below with reference to the following figures.

FIG. 1 is a schematic diagram of an illustrative example environment 100 for automatically determining the presence of an individual. Environment 100 depicts user equipment 102, a macrocell 104, a carrier backend (or Evolved Packet Core (EPC)) 106, a network 120 (e.g., Internet), a retail storefront 108 that includes a Proximal Customer Recognizer (PCR) 110, a router 122, a retail storefront computer 112, and a retail backend 114 that includes a retail backend computer 116 and a retail backend database 118.

User equipment 102 may include any computing device and may be implemented as a single device or as a plurality of devices with components and data distributed among them. Example user equipment 102 includes a mobile phone configured for cellular communications, a wireless smartphone, a tablet computer, or any other computing device configured for cellular or wireless communications.

In one example, the user equipment 102 handles communication functions with external networks such as the macrocell 104. User equipment may also include a universal integrated circuit card (UICC). In one example, the UICC includes a universal subscriber identity module (USIM). The USIM may include an International Mobile Equipment Identity (IMEI) and International Mobile Subscriber Identity (IMSI). The IMEI identifies user equipment 102, and the IMSI identifies the USIM (or SIM) card of user equipment 102. The IMSI indicates the identity of the user of a user equipment. The IMEI and IMSI may be stored (i) in a database operated by the mobile carrier associated with the user of the UE, (ii) in database accessible by the mobile carrier, or (iii) in a third-party database. The IMEI and the IMSI data may be stored in the one or multiple databases.

Macrocell 104 may include any node that provides radio access for user equipment 102. One example macrocell 104 is a node in an evolved UMTS Terrestrial Radio Access Network (E-UTRAN) of an LTE system. The E-UTRAN includes an evolved NodeB (eNodeB or eNB). In one example, an eNB functions similarly to a base transceiver station in a GSM network. The E-UTRAN facilitates communication between the UE 102 and the EPC of the LTE network. In an example, an eNB is connected to the EPC 106 of the mobile phone network and communicates directly with UE 102.

In one example, the EPC 106 includes a Home Subscriber Server (HSS) 126. The HSS 126 includes a database for storing information about the subscribers of the mobile carrier. The HSS database 126 may be queried using IMSI and/or IMEI as keys to return customer information. The EPC may also include a Mobility Management Entity (MME) 123 that interacts with the HSS 126 to control operations of the user equipment. The HSS 126 may store various types of customer information, including name, address, phone number, birthday, email account, voice and/or data plan, payment history, device model, device status, device usage, or any other information stored by the carrier as part of the customer profile stored by the carrier.

The carrier backend also includes an interface with external networks. In one example, the EPC includes a Packet Data Network (PDN) Gateway (P-GW) 125 for communication with external networks using an SGI interface. The P-GW 125 may be connected to an external network such as Internet 120. In other examples, the external network may include private or public networks.

Environment 100 may also include a Retail Storefront 108. The Retail Storefront 108 shown in FIG. 1 includes a PCR 110, a router 122, and a retail storefront computer system 112. The Retail Storefront 108 may be any location, preferably a location of a store that a potential customer with a user equipment 102 enters. In one example, the PCR 110 may be a small cell such as a femtocell or a picocell modified according to the disclosed systems and methods. The small cell may use 3G, 4G, LTE, 5G, or any other technology that provides for small cells such as femtocells or picocells.

In one example, a femtocell implementing the disclosed systems and methods may be used as a PCR to support the recognition of customers. In another example, a picocell modified according to the disclosed systems and methods may be used as a PCR to support a larger capability and coverage of UE compared to a femtocell. In one example, picocells may support on the order of approximately 100 users and provide a wireless cellular range up to about 250 yards.

In the example shown in FIG. 1, PCR 110 is connected to the network 120 via router 122. In other examples, PCR 110 may be coupled to the network 120 via any access point. Example access points may include wired access points (such as a cable modem) or a wireless access points (such as a cable modem that includes wireless transceiver). The retail storefront 108 may include one or more PCRs 110 dispersed throughout the retail storefront 108. The inclusion of additional PCRs 110 in the retail storefront 108 may provide more detailed location information of user equipment 102 providing for a more finely identified customer location. For example, a retail storefront may desire to determine the department in the storefront where the customer is located. The storefront may locate a small cell PCR 110 in each of its departments such as women's clothing, men's clothing, sporting goods, jewelry, etc. to quickly identify the location of the customer's UE.

Identifying the department in which the user equipment 102 is located may provide the storefront with additional information to enhance the customer experience. In one example, inventory information, such as sales or other promotions for a department, may be targeted for display on the user equipment 102. A departmental promotion may be directed to the sales information associated with the department where the customer of the user equipment 102 is currently located. In another example, a departmental promotion may be directed to sales information associated with a department that is different from the department where the customer is currently located to entice the customer to shop at a different department or location within the storefront. In an example, the storefront may use the location information of a customer UE to target and transmit inventory information, such as promotions and offers, to its customers.

Environment 100 may also include a retail backend 114. In this example, retail backend includes a database 118 for storing customer information. In one example, database 118 may include customer profile information captured by retail storefront 108 and stored in database 118 of the retail backend 114. In an example, retail storefront 108 may directly access database 118 to retrieve customer profile information. The customer profile may include, for example, the purchasing history of the customer in the retail storefront 108, including the date, sales amount, and frequency of purchases. In an example, the purchasing history of a customer may include a statistical analysis of the purchasing history reflecting the likelihood of the customer purchasing a product in each department. The purchasing history may also include records of the customer's returns or refunds. In some examples, the retail database 118 may include the customer information returned from the HSS database 126 of carrier backend EPC. In some examples, the retail database 118 may include information specific to the retail store such as membership ID, shopping preferences, or pending reservations or purchases. In some examples, the information stored in the retail database may be used to determine additional products or services that the retail storefront 108 may want to offer to the customer. For example, the store may offer products that may be purchased in addition to, or in lieu of, the products that a customer may be considering.

The customer profile may also include profiles of customers who have no purchasing history with the store. For example, a PCR may identify a customer who has not previously entered the storefront. In this case, a query of a retail backend database 118 using customer account information may result in no database records. Upon determining that the retail backend database does not include a record associated with a customer, a record for this customer may be created in the backend database 118. Information related to the frequency of visits, and other statistical information associated with this person may be stored in the retail backend database 118 and analyzed by the retail back end computer system 116. In this example, the retail back end system may create a profile indicating that a customer may be likely to purchase a particular type of product, enabling the retail store to deliver a potential transaction or deal to the customer.

In an example, the demographic information stored in the retail back end system may include customer purchasing information from other stores such as competitor stores. In an example, the profile information may include demographic information for the customer, including the number and ages of family members, the sex of family members, whether the customer owns a pet, whether the customer is a homeowner, the type of mobile device owned by the customer, the spending habits of the customer, or any other type of demographic information. In an example, a customer may opt in to store the profile information. In an example, the customer may opt in to identify the type of information stored in the profile. In an example, the customer may opt out of a portion or all the information stored in the profile.

In an example, the retail backend database 118 may store customer profile information generated from customer account information. Storing profile information provides efficient retrieval of inventory information, such as promotional or sales items, for a customer so the storefront can push marketing materials more quickly to a customer. In one example, if the PCR detects that a customer is exiting the store, inventory information, such as a promotional or sales item, may be transmitted to the customer to encourage the customer to purchase items from the store.

Figure 2A:
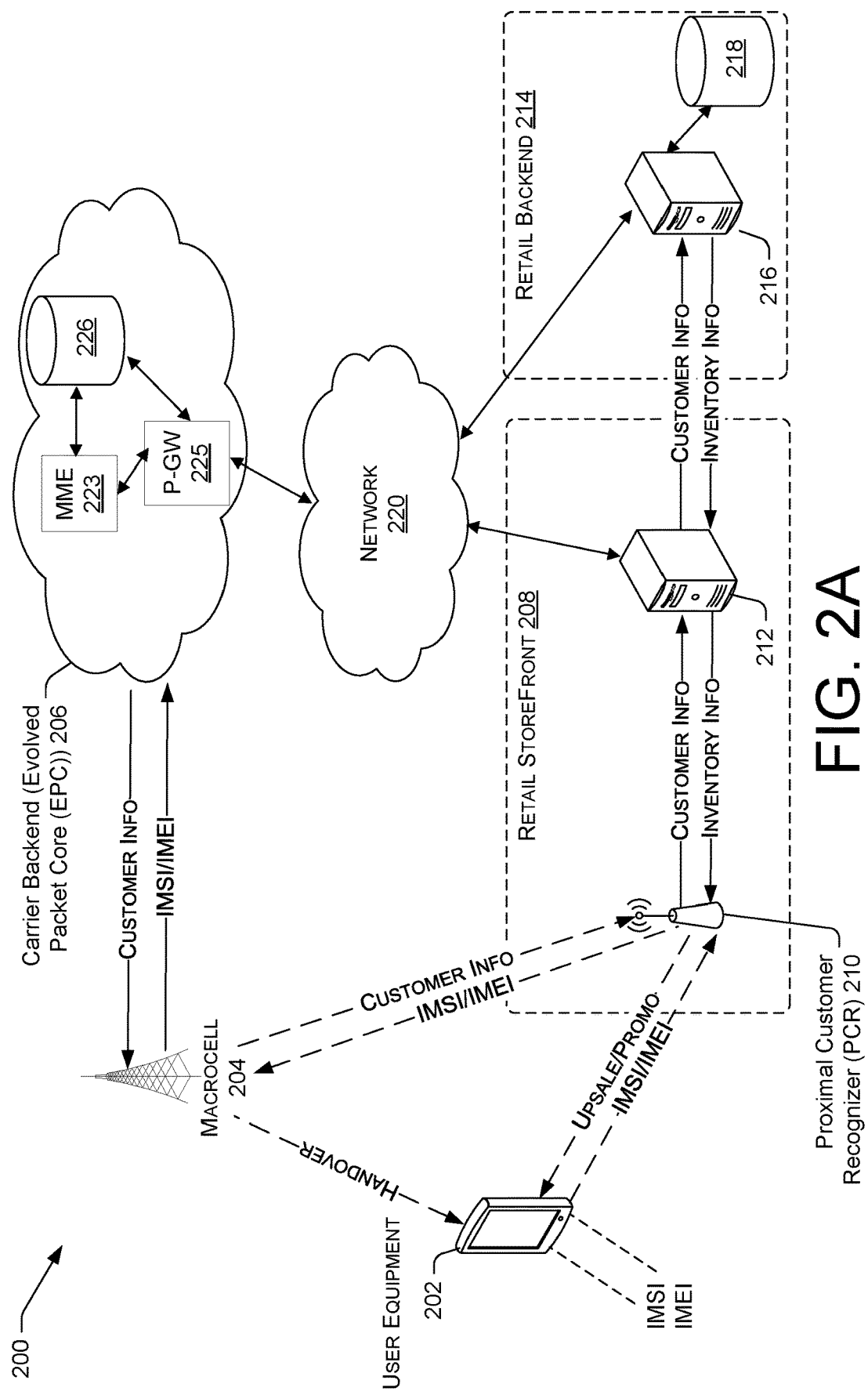
FIG. 2A illustrates an example system for automatically recognizing customers in a storefront in which the Proximal Customer Recognizer (PCR) transmits IMSI and IMEI data to a macrocell.

FIG. 2A illustrates one example environment 200 for data flow using the disclosed systems and methods. In this case, user equipment 202 is initially registered with macrocell 204. When the location of user equipment 202 moves to a location within the radio range of PCR 210, a procedure to register the user device with PCR 210 or to initiate a handover of the user equipment 202 from macrocell 204 to PCR 210 may occur. As part of the request to register or initiate a handover, the user equipment 202 transmits a message that includes IMEI and/or IMSI data to PCR 210.

Upon receiving the message to register or initiate a handover from macrocell 204 to PCR 210, PCR 210 extracts the IMEI and/or IMSI data from the message. The PCR 210 may transmit a request that includes the IMEI and/or IMSI to macrocell 204 to obtain customer information associated with user equipment 202. Macrocell 204 transmits the IMSI and IMEI information to carrier backend (EPC) 206. The MME 223 may query the HSS database 226 with the received IMSI and IMEI data to obtain customer information associated with the user of the user equipment 202.

The HSS 226 returns customer information to MME 223 in response to the query using the IMSI and IMEI data. Example customer information returned may include the name, address, phone number, birthday, email account, voice and/or data plan, payment history, device model, device status, device usage, or any other information stored in HSS database 226 by the mobile carrier as part of the customer account stored by the mobile carrier.

The returned customer information may be included as part of a response message transmitted via the macrocell 204 to PCR 210. Upon receipt of the response message, PCR 210 extracts the customer information from the message, and transmits a message that includes the customer information to the retail storefront computer system. The customer information may be used to query a customer account database associated with the storefront. In one example, the database may be included in a retail backend computer system 216 of the retail backend 214. A retail backend computer system 216 may access a database 218 of the retail backend 214. In one example, the customer information is transmitted to a storefront computer 212 located in the retail storefront 208. The retail storefront computer 212 may forward the customer information to a retail backend computer 216. Retail backend computer 216 may use the customer information to query a retail backend database 218. The retail backend database 218 may include customer account information associated with the customer information and stored by the retail storefront 208 or the retail backend 214. In response to querying the backend database using the customer information, the retail backend computer system 216 obtains customer account information. Some examples of customer account information include a corresponding membership identification, shopping preferences, any pending reservations or purchases, a history of past transactions, outstanding customer account balance, payment history, departments in which the customer purchased products or services, etc.

Upon receiving the customer account information, the retail backend system may generate inventory information, such as customer promotional and other marketing or deal information. For example, the retail backend computer system may analyze the purchasing history of the history to determine a product or service likely to be purchased by the customer. The retail backend computer system 216 may generate inventory information, such as promotional or other marketing or deal information based in part on the department in which the customer is currently located. The retail backend computer system 216 may generate inventory information based upon products or services that have excess inventory. In another example, inventory information may be generated based on the status of the customer's account. In another example, the retail storefront computer 212 may generate the inventory information, such as promotional and other marketing or deal information.

The inventory information may be transmitted from the retail backend computer system 216 to the PCR 210 via the retail storefront computer 212. Upon receiving the inventory information, the PCR 210 forwards the inventory information, such as promotion information and other marketing or deal information to the user equipment 202.

Figure 2B:
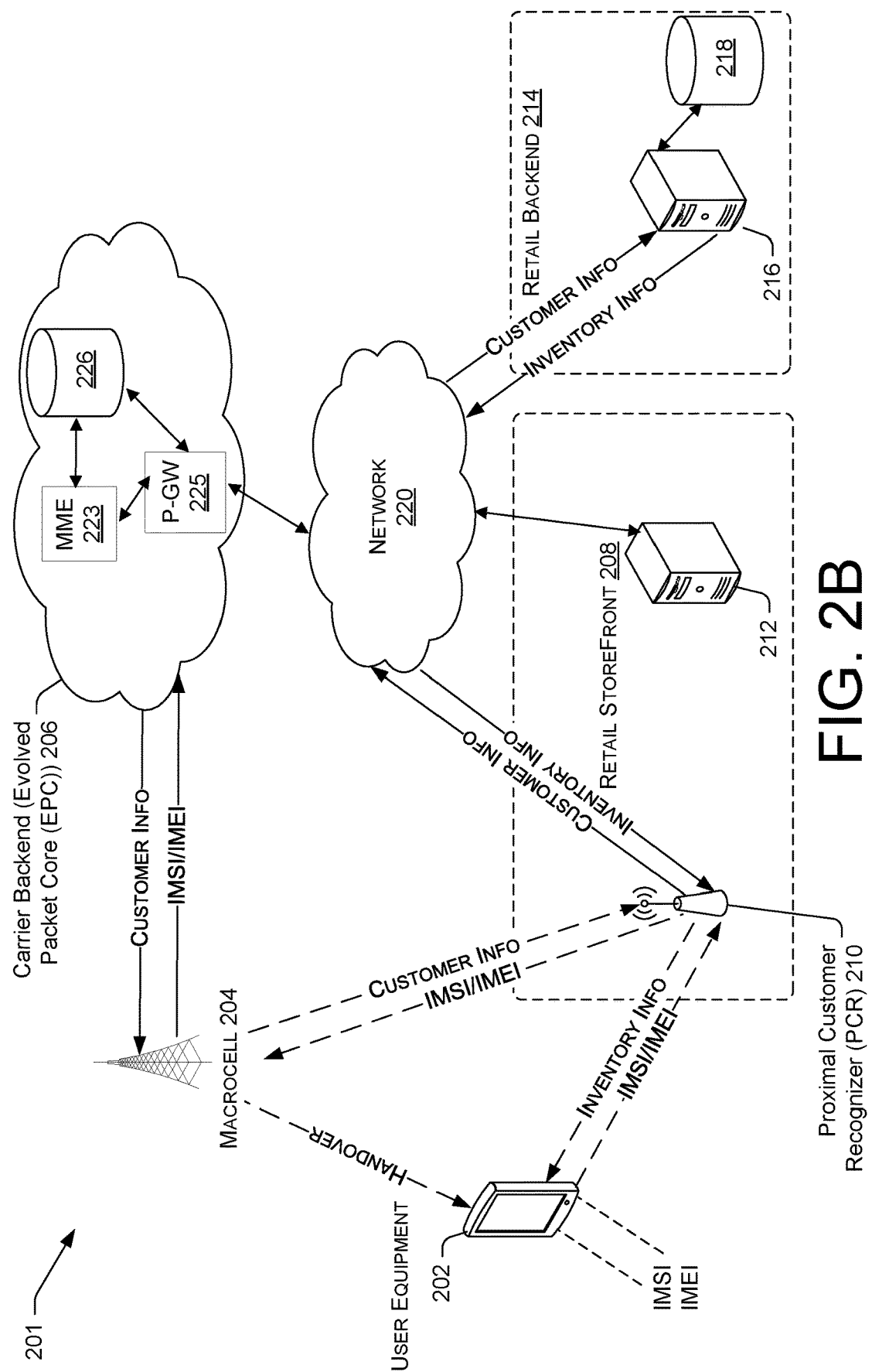
FIG. 2B illustrates an example system for automatically recognizing customers in a storefront in which the Proximal Customer Recognizer transmits IMSI and IMEI data to the carrier backend system (Evolved Packet Core or EPC) via a macrocell network.

FIG. 2B depicts an environment 201 for data flow according to another example of the disclosed systems and methods. In this case, the upon receiving IMEI and IMSI data, PCR 210 transmits a request to EPC 206 to query the HSS database 226 of the carrier backend 206 via network 220. The Internet is one example network 220. In an example, a secure connection is established between the PCR 210 and the carrier backend system (EPC) 206. Once the secure connection is established, the IMSI and IMEI data is transmitted to the carrier backend system (EPC) 206 via the macrocell 204. The IMSI and IMEI information is used to query HSS database 226 to obtain customer information. The customer information retrieved from HSS database 226 is returned to the PCR 210 via network 220.

The PCR 210, in one example, transmits the returned customer information to the retail backend computer system 216 of retail backend system 214 for querying the retail backend database 218. Customer account information may be retrieved from retail backend database in response to the query. The retail backend computer system may receive and analyze the retrieved customer account information to generate inventory information, such as promotional and/or marketing and sale item information for the customer. In another example, at least a portion of the inventory information may be retrieved from retail backend database 218. In an example, at least a portion of the inventory information generated by retail backend computer system 216 may be stored in retail backend database 218. The inventory information, such as promotion information and/or marketing and deal information retrieved in response to the query, is transmitted in a response message to PCR 210.

In one example, information may be exchanged between PCR 210 and retail backend computer system 214 via retail storefront computer system 212. In another example, information may be directly exchanged between the PCR 210 and retail backend computer system 214 via network 220.

FIG. 2C depicts an environment 291 in which the PCR 210 directly transmits a request for customer information to EPC 206 via a non-macrocell network. In this case the request for customer information includes IMSI and IMEI data. In this example, the request is transmitted from PCR 210 to EPC 206 via a non-macrocell network 220. The non-macrocell network may include a WiFi network in one example. The non-macrocell may include a broadband network in an example. In an example, the non-macrocell may include other networks such as a near field communication, Bluetooth, or other networks known to one of ordinary skill in the art.

In response to the request for customer information sent from PCR 210, EPC 206 may transmit the customer information associated with the IMSI and IMEI data to the retail back end 214 via network 220. In an example, the PCR 210 may query the retail back end database 218 for customer account information based on the received customer information from EPC 206. The retail backend 214 may then analyze the customer account information to identify inventory information. The inventory information may be transmitted to PCR via network 220. In an example, the customer information received from the EPC 206 may include an identification of PCR 210.

In this case, when sending a request for customer information to EPC 206, PCR 210 may also send a request to the retail back end 214 to transmit inventory information to PCR 210 upon receipt of customer information from EPC 206 according to the disclosed systems and methods. For example, the retail backend computer system may receive and analyze the retrieved customer account information to generate inventory information, such as promotional and/or marketing and sale item information for the customer. In another example, at least a portion of the inventory information may be retrieved from retail backend database 218. In an example, at least a portion of the inventory information generated by retail backend computer system 216 may be stored in retail backend database 218. The inventory information, such as promotion information and/or marketing and deal information retrieved in response to the query, is transmitted in a response message to PCR 210.

In another example, the EPC 206 may transmit the associated customer information to PCR 210 via the macrocell 204, rather than via the network 220. The PCR 210 may transmit the customer information returned via the macrocell 204 to the retail backend computer system 216 of retail backend system 214 for querying the retail backend database 218. Customer account information may be retrieved from retail backend database in response to the query. The retail backend computer system may receive and analyze the retrieved customer account information to generate inventory information, such as promotional and/or marketing and sale item information for the customer. In another example, at least a portion of the inventory information may be retrieved from retail backend database 218. In an example, at least a portion of the inventory information generated by retail backend computer system 216 may be stored in retail backend database 218. The inventory information, such as promotion information and/or marketing and deal information retrieved in response to the query, is transmitted in a response message to PCR 210.

In one example, information may be exchanged between PCR 210 and retail backend computer system 214 via retail storefront computer system 212. In another example, information may be directly exchanged between the PCR 210 and retail backend computer system 214 via network 220.

Figure 3:
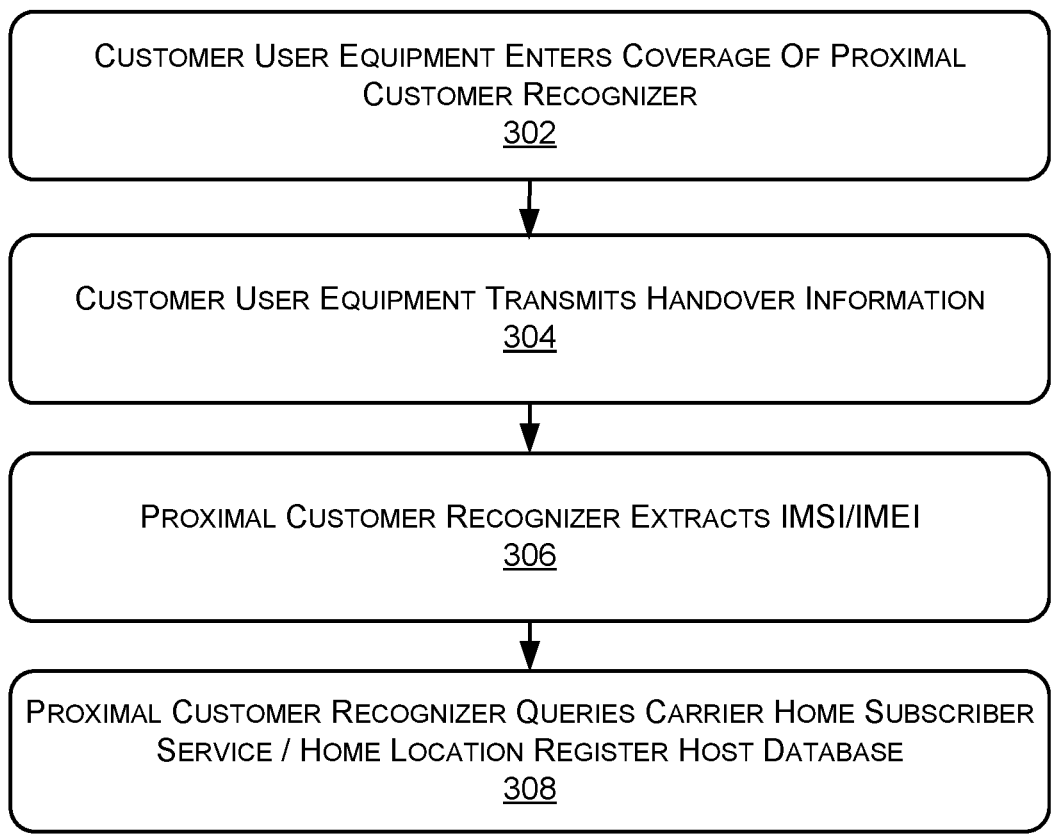
FIG. 3 illustrates an example method performed by a Proximal Customer Recognizer.

FIG. 3 depicts a flow diagram illustrating steps performed in one example process. In this process, a customer UE (e.g., UE 102) may be initially coupled to and/or registered with a macrocell (e.g., macrocell 104). As the customer UE enters the radio coverage of a PCR (e.g., PCR 102) at block 302, a request to initiate a handover of the UE from the macrocell to the PCR occurs. As part of the request to initiate a handover, the customer UE transmits handover information to the associated PCR, which occurs at block 304. In one example, the handover information in the request to initiate a handover includes IMSI and IMEI data. After the PCR receives the request to initiate the handover request, the PCR extracts the IMSI and IMEI data at block 306. Upon extracting the IMSI and IMEI data, the PCR sends a request to query the HSS Host Database with the extracted IMSI and IMEI data at block 308.

Figure 4:
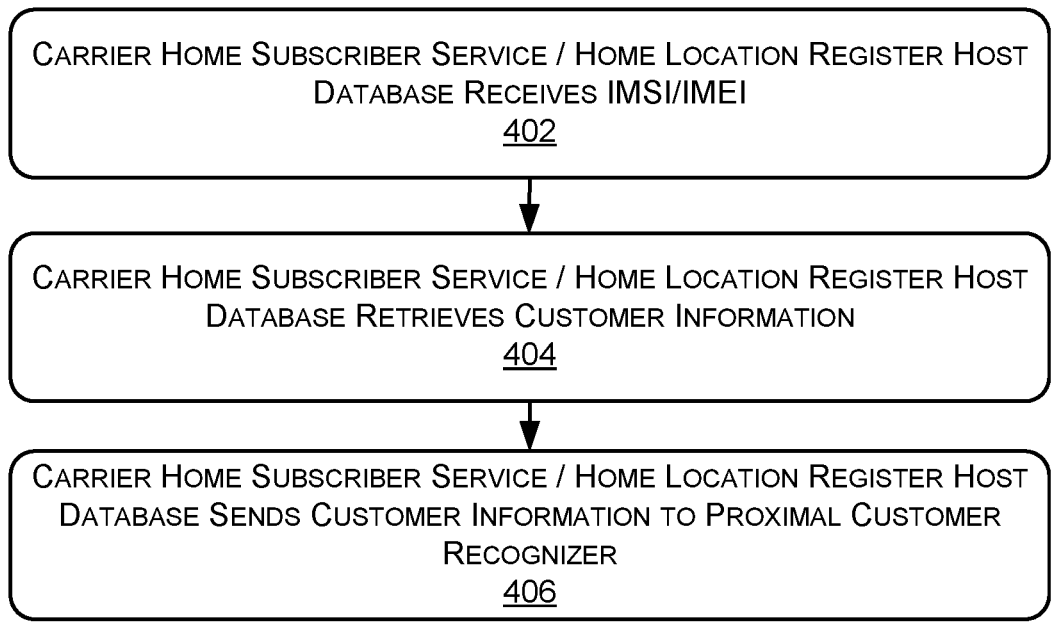
FIG. 4 illustrates an example method performed by a carrier computer system in response to receiving a request for customer information from a Proximal Customer Recognizer.

FIG. 4 depicts a flow diagram illustrating steps performed by the backend carrier database (EPC) (e.g., 106/206) to obtain customer information. At block 402, the carrier HSS/HLR (e.g., 126/226) database receives the IMSI and IMEI data. In response to receiving the IMSI and IMEI data, the carrier HSS/HLR data retrieves customer information at block 404. The customer information can include name, address, phone number, birthday, email account, voice and/or data plan, payment history, device model, device status, device usage, demographic information, or any other information stored by the carrier as part of the customer profile stored by the carrier. After retrieving customer information at block 404, the carrier HSS/HLR Host Database sends the customer information to the PCR at block 406.

Figure 5:
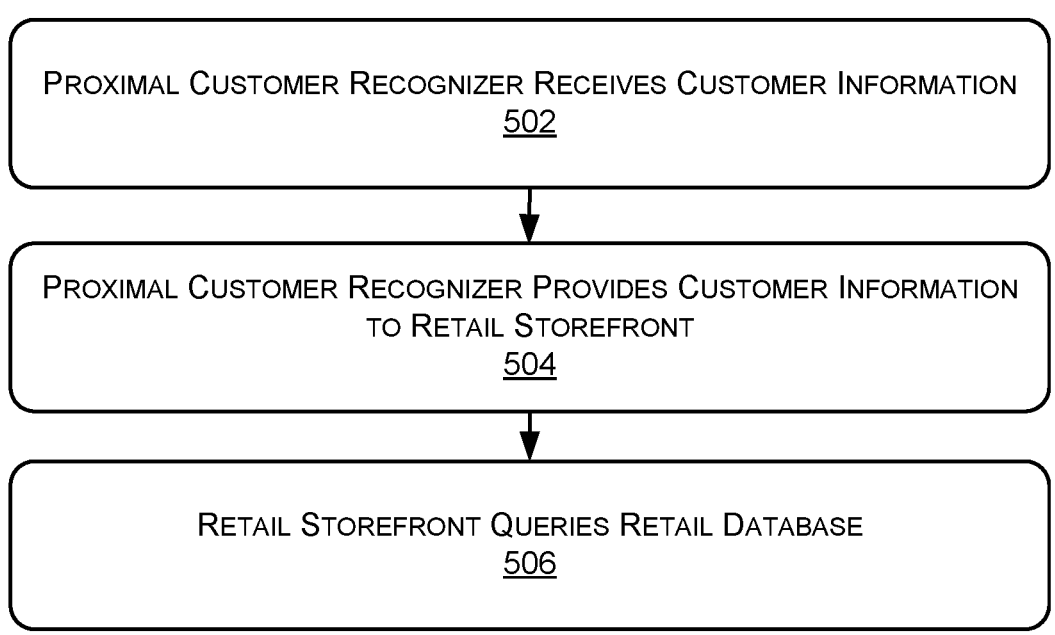
FIG. 5 illustrates an example method performed in accordance with the disclosed methods and systems.

FIG. 5 depicts a flow diagram illustrating steps performed by the retail storefront upon receipt of the customer information by the PCR. In this example, the PCR receives customer information from the HSS database of the EPC of the carrier at block 502. Upon receipt of the customer information, the PCR provides customer information to a retail storefront computer system at block 504. The retail storefront uses the customer information to query the retail backend database system to obtain customer account information stored by the retail backend associated with the retrieved customer information.

Figure 6:
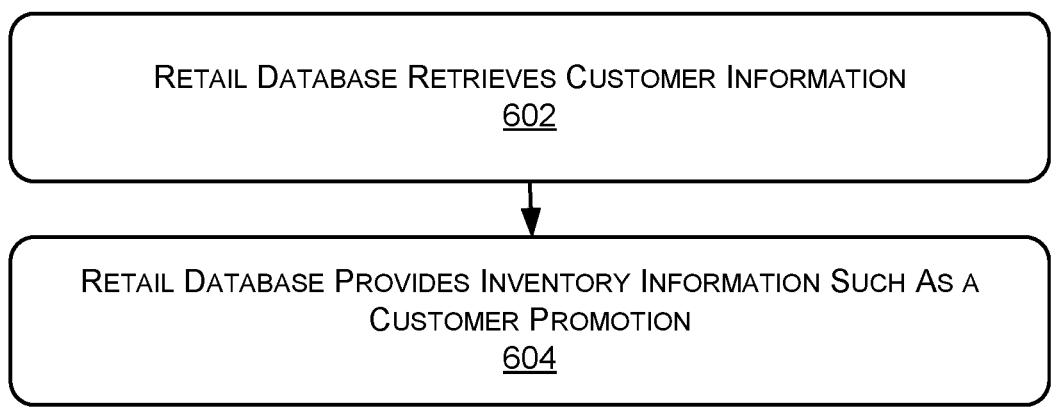
FIG. 6 illustrates an example method performed by the retail computer system.

FIG. 6 depicts a flow diagram illustrating steps performed in response to the querying the storefront backend database using the customer information received from the carrier backend. At block 602, the retail database searches for customer account information in the retail database using the customer information received from the carrier backend. In one example, the PCR queries the retail backend computer system using the name, address, and phone number received from the HSS database of the EPC of the carrier backend. In response to this query, the database may retrieve various customer account information. Some examples of customer account information include a corresponding membership identification, shopping preferences, any pending reservations or purchases that the customer may have reserved for delivery, etc. In an example, account information may include a history of past transactions made by the customer, the outstanding customer account balance, payment history of the customer, and/or departments in which the customer purchased products or services.

Upon receiving the customer account information, the retail backend computer system 216 may create inventory information, such as a customer promotion, for transmission to the customer at block 604. In an example, the inventory information may be based on products or services that may be obtained in lieu of, or in conjunction with, products in the department in which the customer is located. Other examples of inventory information include products or services related to the customer's past purchasing history or products the storefront may choose to highlight as a sale item. In other examples, the customer retail backend database may not have records of a purchase history or other customer account information. In this case, the retail backend computer system 216 may identify inventory information, such as a promotion item, to provide to the customer as a deal, thereby attempting to create a relationship with the potential customer.

The retail backend computer system 216 receives customer account information stored in the database and may generate inventory information, such as promotional and marketing and sales information, targeted for transmission to a customer. In one example, the backend computer system generates promotional and marketing and sales information, based in part on the purchase history of the customer and the retail store department in which the customer is located. Analyzing the customer purchase history in light of the customer's current purchasing actions is one example of facilitating consumer purchases. Promotional or sales information could also be generated based on an analysis of the past purchasing history of the customer. Other statistical analyses may be applied to generate inventory information.

Figure 7:
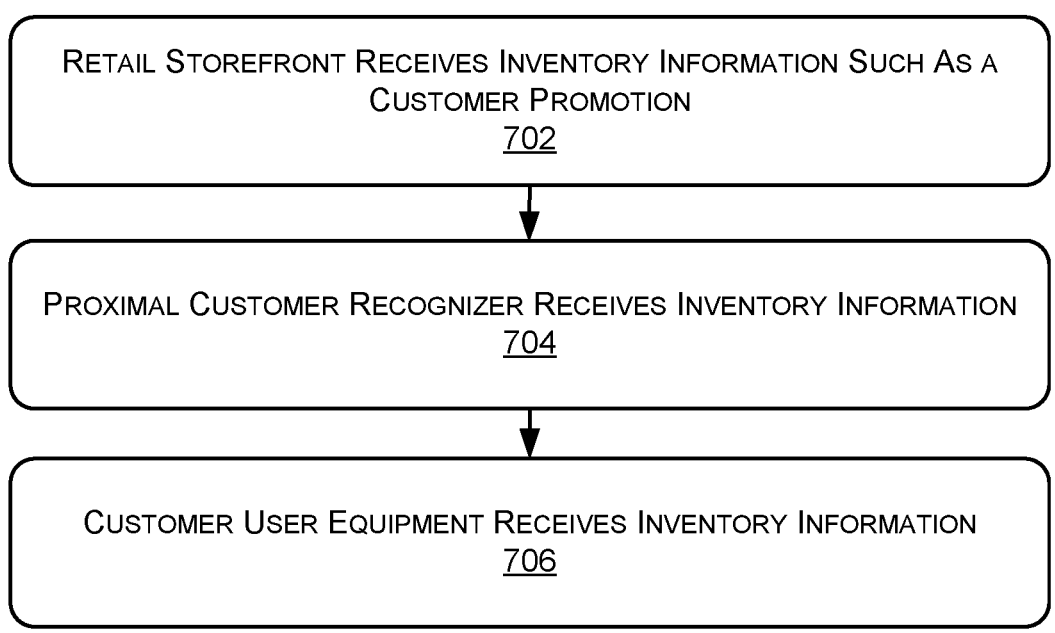
FIG. 7 illustrates an example method performed in accordance with the disclosed systems and methods.

FIG. 7 depicts a flow diagram illustrating steps performed by the retail store front in response to receiving customer account information from a retail backend. At block 702, the retail storefront receives the inventory information such as customer promotion information. The customer promotion information may be any promotional or marketing information. For example, the customer promotion information may be information related to additional deals or sales for items in the inventory of the department that the customer is currently located. In another example, the customer promotion information may be information related to additional deals or sales for items in inventory for another department. The customer promotion information in an example may include information for a type of item that the customer has not previously purchased. The customer promotion information may be a sales promotion targeted specifically to new customers, creating loyalty with the storefront. In still other examples, inventory information such as other marketing or promotional information may be transmitted to the customer.

At block 704, the PCR receives the inventory information transmitted from the retail backend. Upon receipt, the PCR may transmit the inventory information to the customer UE associated with the IMEI and IMSI data obtained by the PCR. In this fashion, in one example, the PCR transmits IMEI and IMSI data from a request to initiate a handover received from the carrier backend database. The carrier backend (EPC) queries a database with the IMEI and/or IMSI data to obtain customer information. The PCR forwards the received customer information to a retail backend database to collect customer account information stored by the retail storefront. The customer account information may be analyzed to generate inventory information, such as promotional information, to transmit to the customer UE.

Figure 8:
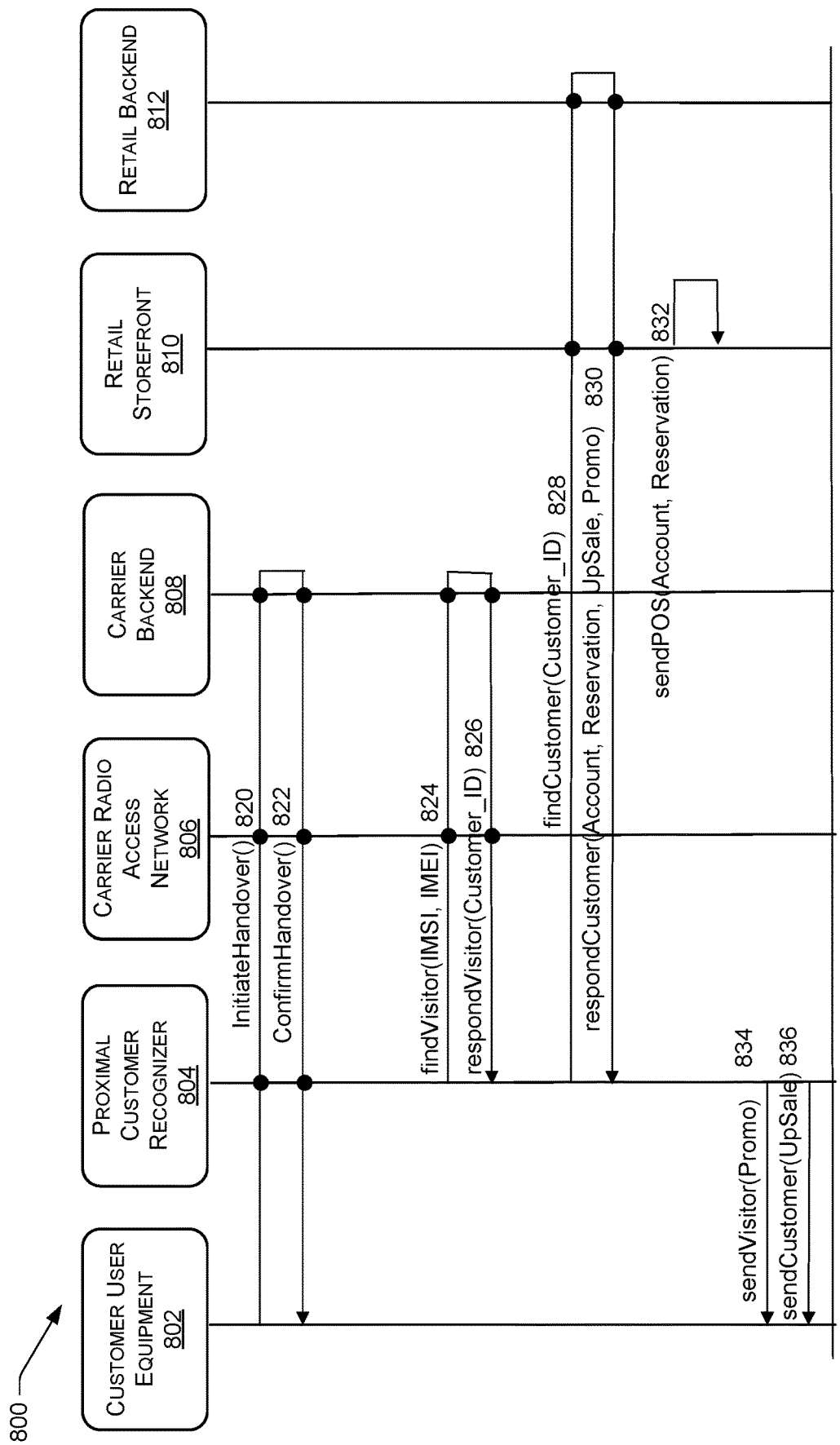
FIG. 8 illustrates an example timing diagram depicting functions performed by various components of one example system for recognizing customers.

FIG. 8 depicts an example timing diagram 800 illustrating example requests and responses associated with one implementation of the disclosed systems and methods. A request to initiate a handover 820 is made by the customer UE 802. The request 820 to initiate the handover includes IMSI and IMEI data and is directed to the carrier backend 808. This request 820 is routed to the carrier backend 808 via the PCR 804 and the Carrier RAN (or macrocell) 806. The carrier backend (EPC) 808 responds to the request 820 to initiate a handover with a ConfirmHandover( ) response 822. As the message 820 to initiate a handover is forwarded from the PCR 804 to the Carrier RAN, PCR 804 may extract the IMSI and IMEI information.

PCR 804 may send a request 824 to the carrier backend 808 to identify the customer using the UE 802. The request 824 sent by the PCR includes the IMSI and IMEI data, and the IMEI and IMSI data may be used to query a carrier backend database. Upon determining a match with the received IMEI and IMSI data, the carrier backend may respond with a message that includes a customer identifier or other information identifying the customer in the carrier backend database. As discussed previously, the customer information may include various types of information, including name, address, phone number, birthday, email account, voice and/or data plan, payment history, device model, device status, device usage, demographic information, or any other information stored by the carrier as part of the customer profile. The customer information returned from the carrier backend 808 is received by the PCR 804 at 826.

Upon receipt of customer information, the PCR 804 may transmit a request to the retail backend 812 for customer account information. In one example, the customer information is sent to the retail backend system at message 828. The retail backend system may query a backend database with the received customer information to obtain customer account information. As discussed previously, the customer account information may include a corresponding membership identification, shopping preferences, any pending reservations or purchases, a history of past transactions, outstanding customer account balance, payment history, or departments in which the customer purchased products or services. The retail backend system may send a response message 830 to the PCR 804 including customer account information. The customer account information may include inventory information, such as a customer reservation, an upsale, and a promotion as shown in FIG. 8. In other examples, the response message may include any or all the customer account information retrieved by the retail backend system.

The SendPOS message 832 illustrates an example in which the retail backend system 812 previously sent a message 830 that includes a reservation for a particular customer account. In this case, the customer previously reserved a product and entered the store to obtain and pay for the product. In this example, the retail storefront system 810 extracts the reservation information from the response message 830 from the retail backend 812. The retail storefront may display the information on its computer using message 830 (SendPOS(Account, Reservation)) for the user to pick up, or for the retail computer to request delivery of the product. In these examples, the retail backend message 830 returns customer promotion information targeted to a user interacting with a point of sale device at the retail storefront to obtain the product.

After receiving the message 830 from the retail backend computer system, PCR 804 may extract the inventory information, such as promotional information, and forward the inventory information to the customer UE 802 via message 834. In this example, the inventory information is forwarded to a user that does not have customer account information stored on the retail backend computer system. Alternatively, the PCR 804 extracts inventory information, such as sales and marketing information, and forwards that information in message 836 to the UE 802 of a current or previous customer. The marketing information in message 836 may complement or be in lieu of products or services selected by the customer.

Figure 9:
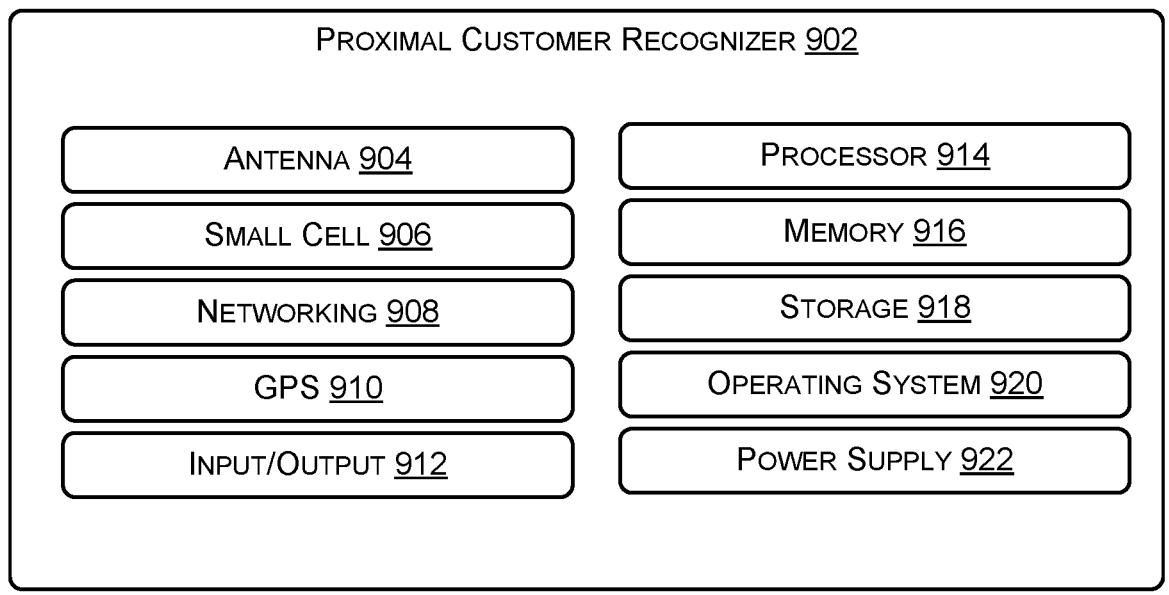
FIG. 9 illustrates an example Proximal Customer Recognizer that is capable of performing a handover operation.

FIG. 9 depicts an example PCR 902. In this case, PCR 902 includes the following components: antenna 904, small cell 906, networking component 908, GPS 910, input/output 912, processor 914, memory 916, storage 918, operating system 920, and power supply 922.

Antenna 904 facilitates radio frequency (RF) communications with a macrocell and user equipment. Small Cell 906 handles the UE handover with the macrocell. The UE handover may be a hand-in operation (control passing from macrocell to small cell) or a hand-out operation (control passing from small cell to macrocell).

PCR 902 may include networking component 908 modules for providing ports and modules for communicating with the outside world. The networking component 908 includes transceiver ports for local area networks (LANs) and wide area networks (WANs). In one example, the LAN and/or WAN ports provide a wired connection to the Internet. The networking component 908 may also include a wireless communications module that includes one or more wireless transceivers. For example, the transceivers can include a network interface card (NIC), a network adapter, a LAN adapter, or a physical, virtual, or logical address to connect to various network(s), or to the PCR 902, for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

The wireless transceiver may wirelessly receive and transmit data. The wireless transceiver may be included in a wireless communication chip. The wireless communication chip in one example may be located in the PCR 902. In another example, the wireless communication chip may be located on a separate wireless component. GPS 910 provides global positioning data for the PCR.

PCR 902 may include input/out (I/O) ports 912 for input/output devices. The I/O ports may include USB, serial, parallel, HDMI, display ports, digital video interface (DVI), Ethernet, and any other ports known to a person of ordinary skill in the art. These input/out ports may collectively be referred to as I/O 912. The I/O ports interface with device(s), such as a keypad, a cursor control, a touch-sensitive display, voice input device, etc., a display, speakers, printers, etc. These ports are well known in the art and need not be discussed at length here.

The PCR 902 includes one or more processors 914. Processor(s) 914 may be any type of processors, including a central processing unit (CPU), a graphics processing unit (GPU), or both CPU and GPU, or other processing unit or component known in the art.

PCR 902 may also include data storage devices (removable and/or non-removable) such as, for example, magnetic disks, optical disks, or tape. Such storage is illustrated in FIG. 9 by storage 918. PCR 902 may also include memory 916. Example memory devices include RAM, ROM, firmware, flash memory, EEPROM, or other types of memory storage known to one of ordinary skill in the art. Tangible computer-readable media can include volatile and nonvolatile, removable and non-removable media implemented in any method or technology for storage of information, such as computer readable instructions, data structures, program modules, or other data. Memory 916 and storage 918 are examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the PCR 902. Any such tangible computer-readable media can be part of the PCR 902. In an example, storage 918 provides local storage for the configuration and log files of the PCR 902. In an example, memory 916 provides temporary data storage for processing and for loading and storing the operating system of the PCR 902.

Power Supply 922 provides AC and/or DC power for the PCR. In some examples, the power supply 922 includes backup power supply such as a backup battery.

Figure 10:
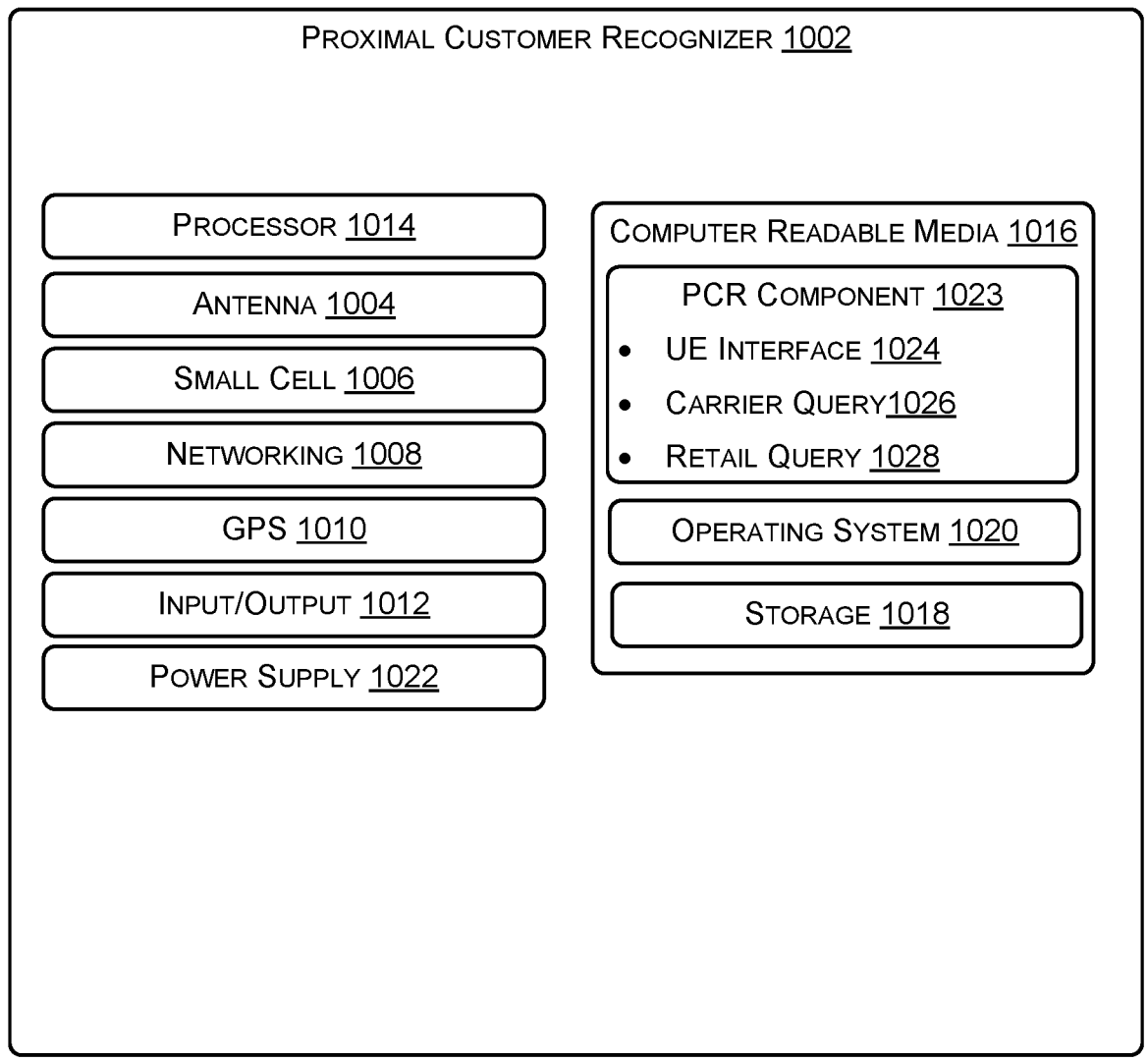
FIG. 10 illustrates another example Proximal Customer Recognizer that is capable of performing a handover operation.

FIG. 10 illustrates another example PCR. PCR 1002 includes processor 1014, antenna 1004, small cell 1006, networking ports 1008, GPS module 1010, input and output ports 1012, and power supply 1022, each of which was discussed previously with regard to FIG. 9 and will not be repeated here. PCR 1002 also includes computer readable media 1016, which can include any type of volatile or nonvolatile memory, including the storage 918 and memory 916 discussed previously with regard to FIG. 9.

Computer readable media 1016 includes a PCR component 1023 that performs functions that facilitate customer recognition. The PCR component includes computer instructions that when executed identify a customer and transmit promotional and marketing information to the customer UE. In one example, the PCR component 1023 includes a UE interface 1024 for communication between the PCR 1002 and the customer UE 802. For example, the UE interface 1024 analyzes a request to initiate a handover and extracts the IMSI and IMEI data from the requests. The UE interface 1024 may also transmit inventory information, such as promotional information received from a retail backend computer system, to the customer UE. In one example, the UE interface 1024 of the PCR 1002 controls communication of information between the customer UE 802 and PCR 804.

The PCR component 1023 also includes instructions that when executed request a query against the HSS database of the EPC of the carrier database. Carrier query 1026 queries the HSS database of the carrier backend system for customer information. In one example, the carrier query 1026 queries the carrier backend database using the IMSI and/or IMEI data. The carrier backend database identifies customer information based in part on the IMSI and IMEI data received from the PCR 1002. Example customer information has been discussed previously. The carrier backend database transmits the customer information to the PCR 1002, and the carrier query 1026 of the PCR 1002 receives the transmitted customer information.

The PCR component 1023 also includes instructions that when executed create and/or request a query to be made against the retail database using the returned customer information. Retail query 1028 queries the retail backend database using the returned customer information to identify customer account information. The customer account information may be analyzed to generate inventory information, such as promotion information, or other marketing or sale item information. In one example, the retail backend returns customer account information in response to the query. In another example, the retail backend returns promotion information or other marketing or sale item information. In another example, the retail backend returns a combination of customer account information and promotion or other marketing or sale item information. Example customer account information has been discussed previously.

The computer readable media 1016 may also include an operating system 1020 and storage 1018. Storage 1018 may include volatile and/or non-volatile storage. Storage 1018 may also include computer readable media long term storage devices such as hard disk drives.

Figure 11:
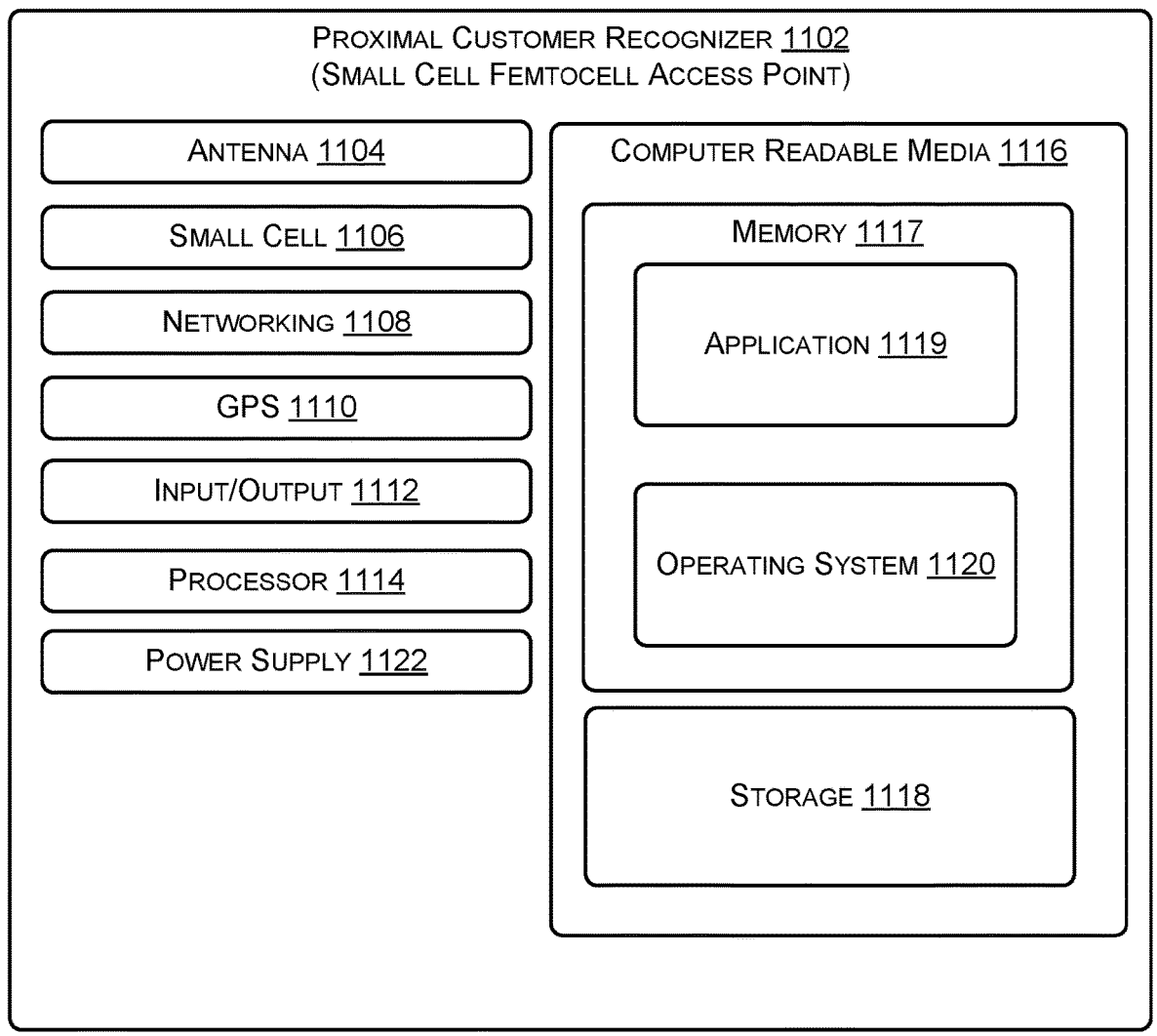
FIG. 11 illustrates an example small cell femtocell access point that is capable of performing a handover operation and is capable of automatically recognizing customers.

FIG. 11 depicts another example PCR. The PCR 1102 may be a small cell femtocell access point (FAP) that has been modified according to the disclosed systems and methods. In one example, PCR 1102 has been modified to include an application 1119 stored in memory 1117 of a computer-readable media 1116. PCR 1102 also includes storage 1118, which may be used during operation of PCR 1102. In this example, a FAP is modified via a maintenance release utilizing its existing Application Program Interfaces (APIs) to enable the modified or enhanced FAP to send requests to the carrier backend (EPC) for customer information.

PCR 1102 depicted in FIG. 11 is a modified LTE FAP that manages handover traffic. The software of the LTE FAP may be upgraded as discussed above to provide for the functionality described herein. Additional memory and storage for the FAP may be needed to add the PCR functionality for user information retrieval or to configure protocol support for remote management. Information retrieval may include IMEI, IMSI, customer information obtained from the carrier backend system, customer account information obtained the retail backend system, and inventory information such as customer promotion information, and/or sales and marketing information. Additional storage may also be needed to store error logs, registration history, configuration history and information, log functions, and for the general operation of the PCR.

PCR 1102 also includes antenna 1104, small cell 1106, networking ports 1108, input/output ports 1112, processor 1114, operating system 1120, and power supply 1122. Antenna 1104 provides radio frequency (RF) communications with a macrocell and the user equipment. Small cell 1106 handles the UE handover to and from a macrocell. Networking ports 1108 provide interface ports for a LAN and a WAN and a WiFi module for wireless communications. GPS 1110 provides location positioning information for PCR 1102. Input/output ports 1112 provide interfaces for the exterior environment, including LED lights, USB ports, and a speaker. Processor 1114 provides the processing unit for the PCR 1102. The processor also has access to computer readable media 1116, which includes operating system 1120 and memory 1117, and to storage 1118. Memory 1117 provides, among other things, temporary data storage for processing. Storage 1118 provides for local data storage for configuration and log files. In an example, memory 1117 many also provide for local data storage for configuration and log files. Operating system 1120 provides the operating system for PCR 1102. Power supply 1122 provides the AC/DC power and optional battery backup for PCR 1102. Each of these components have been discussed with respect to FIG. 9, and that discussion is incorporated herein and will not be repeated.

PCR 1102 also includes an application 1119 stored in computer readable media 1116. Application 1119 includes instructions that when executed perform the functions described herein. For example, Application 1119 may extract IMSI and IMEI data from a handover request. Application 1119 may also include executable instructions to request a query of a carrier backend database using the IMSI and IMEI data and to retrieve customer information. Application 1119 may additionally include executable instructions to request a query of a retail storefront backend database using the customer information returned from the carrier backend. In an example, Application 1119 may include executable instructions to request a query of a retail storefront database using the IMSI and/or IMEI data. In an example, the customer information and a portion (or the entirety) of the IMSI and IMEI data may be used to query the retail storefront database. Application 1119 may also include executable instructions to receive the promotional and sale items from the retail backend database and forward that information to a customer's UE.

In an example, the storefront backend may include a database (or have access to such a database) including the IMSI and/or IMEI information. In that case, PCR 1102 need not query the carrier backend database to obtain customer information from the IMSI and/or IMEI data. Instead, the PCR 1102 may query the storefront database using the IMSI and/or IMEI data to receive inventory information such as promotional or sale information for transmission to a customer UE.

Figure 12:
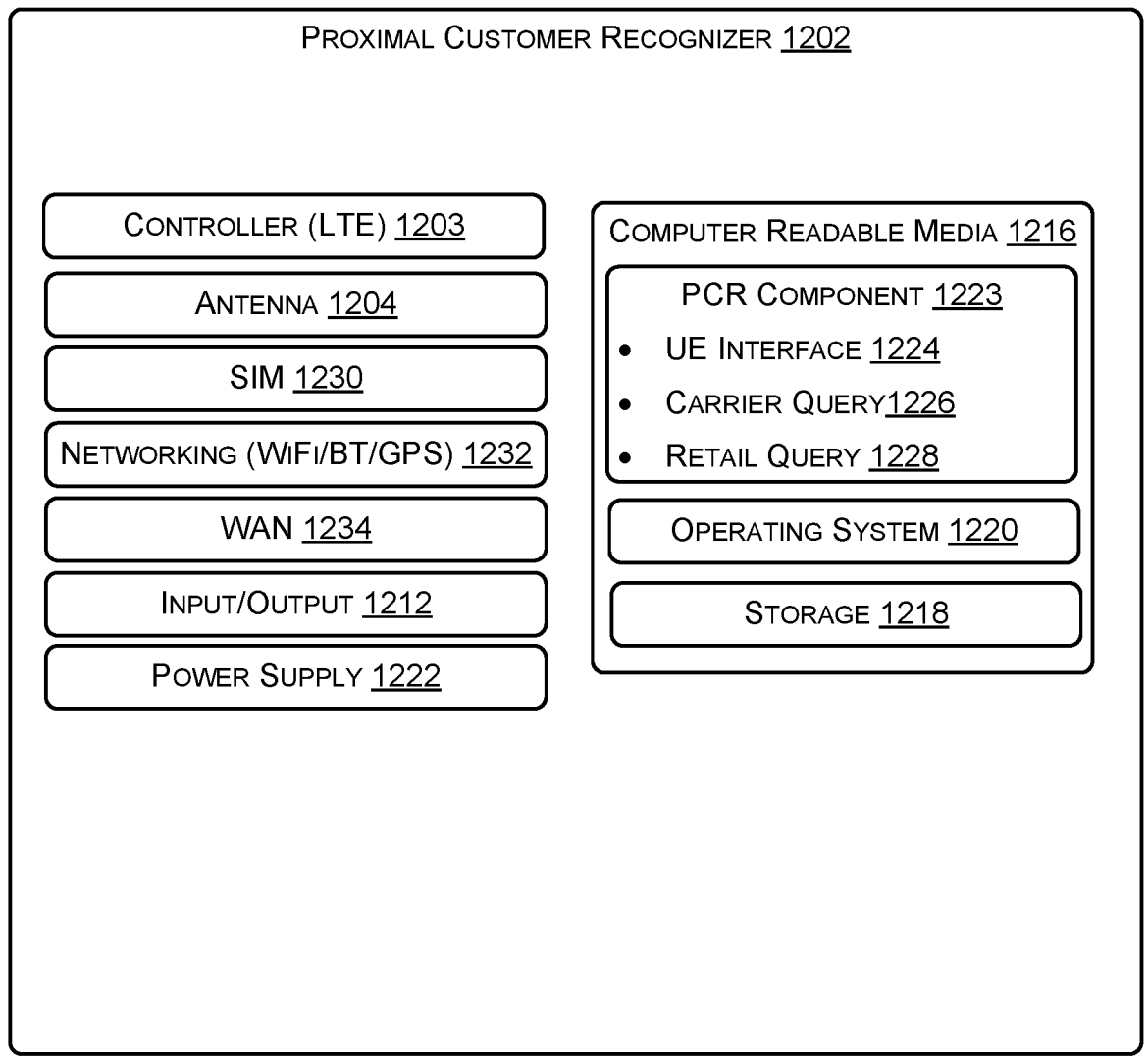
FIG. 12 illustrates an example Proximal Customer Recognizer.

FIG. 12 depicts yet another example of a PCR. In this case, PCR 1202 is configured to extract IMSI and IMEI data during a UE registration attempt. PCR 1202 functions as a femtocell access point, but does not carry handover traffic. In this case, the PCR 1202 extracts the IMSI and IMEI from a registration request from the UE, but the UE remains connected to the macrocell it is currently connected with. In one example, PCR 1202 may connect directly to the radio access network (RAN) of the carrier using UMTS WCDMA air interface to utilize non-LTE cellular technologies to connect to the carrier RAN for querying customer information from a carrier database.

PCR 1202 includes an LTE baseband controller 1203. The controller may be any type of processor that is configured as an LTE baseband controller. PCR 1202 includes an antenna 1204 for radio frequency (RF) communications with the macrocell and UE. PCR 1202 also includes a subscriber identity module (SIM), an eSIM, or universal subscriber identity module (USIM). The SIM (or USIM) identifies the subscriber of the UE. PCR 1202 reads the SIM 1230 for registering to the corresponding carrier network. The SIM (or USIM) may be implemented in hardware, in software, in firmware, or a combination of hardware, software, and firmware. PCR 1202 may include wireless networking ports 1232, including WiFi (e.g., 802.11-based protocols), Bluetooth, and GPS protocols. PCR 1202 may also include a WAN 1234 (e.g., Ethernet connection) for connecting to wired networks. PCR 1202 may include input/outputs 1212, which as discussed previously, provide interface ports to external devices. Example input/outputs 1212 include LEDs, USB ports, and speakers. PCR 1202 may also include a power supply 1222 for providing AC/DC power with optional battery backup power to PCR 1202. PCR 1202 also includes operating system 1220 and storage 1218. Storage 1218 provides for local data storage for configuration and log files. In an example, PCR component may also include a memory for local data storage for configuration and log files.

The PCR 1202 includes a PCR component 1223 stored in computer readable media 1216. PCR component 1223 may include a UE interface component 1224, a carrier query component 1226, and a retail query component 1228. The UE interface component 1224 includes computer instructions that when executed extract the IMSI and IMEI data for a UE during a UE registration attempt. For example, when a UE is in close proximity to PCR 1202, the UE may send a request to register to PCR 1202. This request to register may include the IMSI and IMEI data for the PCR 1202 to extract. The IMSI is used to identify the detected user, and the IMEI is used to identify the UE. In this case, the UE remains connected to the macrocell it is currently connected with.

PCR 1202 may include a carrier query component 1226. The carrier query component 1226 includes instructions that when executed generate a query, using the IMSI and IMEI data, for the carrier backend database. In an example, the PCR 1202 may send a request via a network to the carrier backend (EPC) to query the HSS of the EPC using the IMSI and IMEI data. In another example, the PCR 1202 may utilize cellular technologies (either Non-LTE or LTE) to connect to the carrier RAN of the macrocell network to query the carrier backend database, with the IMEI and IMSI for customer information. In response to the carrier query 1226, PCR may receive customer account information associated with the IMSI and IMEI data from the carrier. The carrier query component 1226 is configured to receive the customer account information from the carrier for further processing.

Upon receiving the customer account information, the carrier query component 1226 may generate, using the retail query component, a query for the retail backend database. This retail query component 1228 includes the customer account information received from the carrier backend. In response to the retail query, the retail backend database may send inventory information, such as promotional and sale item information to the PCR 1202.

Upon receiving the promotional and sale item information from the retail backend database, the PCR 1202 may forward that information to the customer UE. In another example, the PCR 1202 may forward the promotional and sale information to a point of sale terminal. For example, previously ordered or reserved products or services by a consumer may be sent directly to the point of sale terminal to complete the purchase with the customer.

In other examples, the PCR may be configured to communicate the extracted IMEI and IMSI data directly with the retail backend database. For example, the retail backend database may maintain (or have access to) a database of IMEI and IMSI data. In that case, the PCR component 1223 need not query the carrier database, but instead may query the retail backend database using the IMSI and IMEI information.

Figure 13:
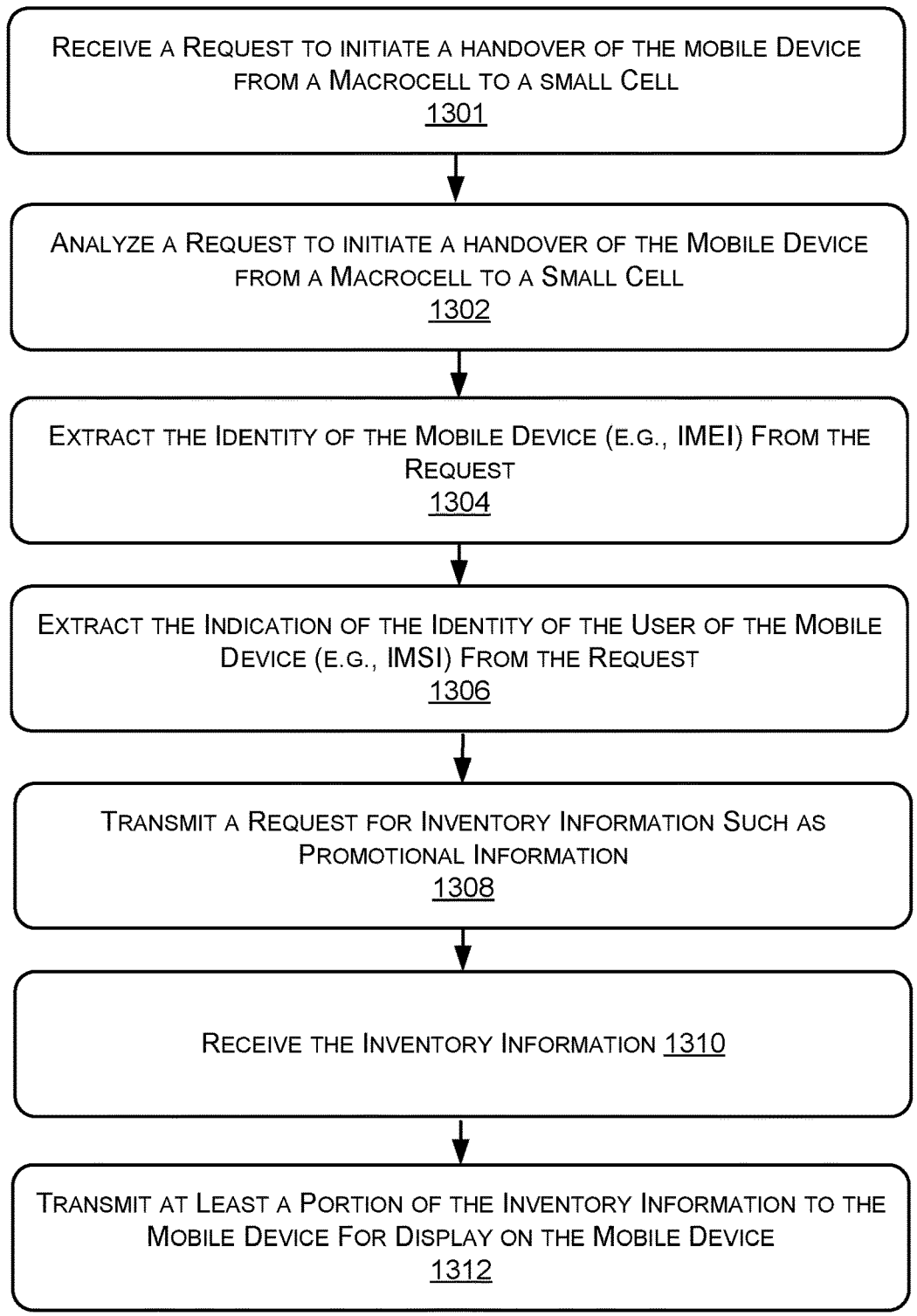
FIG. 13 illustrates operations performed by an example Proximal Customer Recognizer according to the disclosed systems and methods.

FIG. 13 depicts example operations performed by the small cell in accordance with the disclosed systems and methods. In an example, the operations may be included in an application stored on the small cell. In an example, the operations may be stored in a computer-readable memory of the small cell. At block 1301, a small cell receives a request to initiate a handover of the mobile device from a macrocell to the small cell. After receiving the request, the small cell analyzes the request to initiate the handover at block 1302. After analyzing the request, the small cell extracts the identity of the mobile device from the request at block 1304, and the small cell extracts an indication of the identity of the mobile device from the request at block 1306. One example of the identity of the mobile device is IMEI data, and one example of an indication of the identity of the user of the mobile device is IMSI data. At block 1308, the small cell transmits a request for inventory information such as promotional information. In one example, the small cell transmits the IMEI and IMSI data to the storefront computer system to obtain the inventory information. In an example, the small cell transmits a request that includes the IMEI and IMSI data to the carrier system to obtain customer information. The carrier system may query an HSS database with the IMSI and IMEI to retrieve customer information. In one example, the customer information includes an identity of the mobile device and an indication of the user of the mobile device. The customer information is received by the small cell, and included into a request to the storefront computer system to obtain promotional information. In response to the request for inventory information, the small cell receives the inventory information at block 1310. The small cell transmits at least a portion of the inventory information to the mobile device for display on the mobile device at block 1312.

Figure 14:
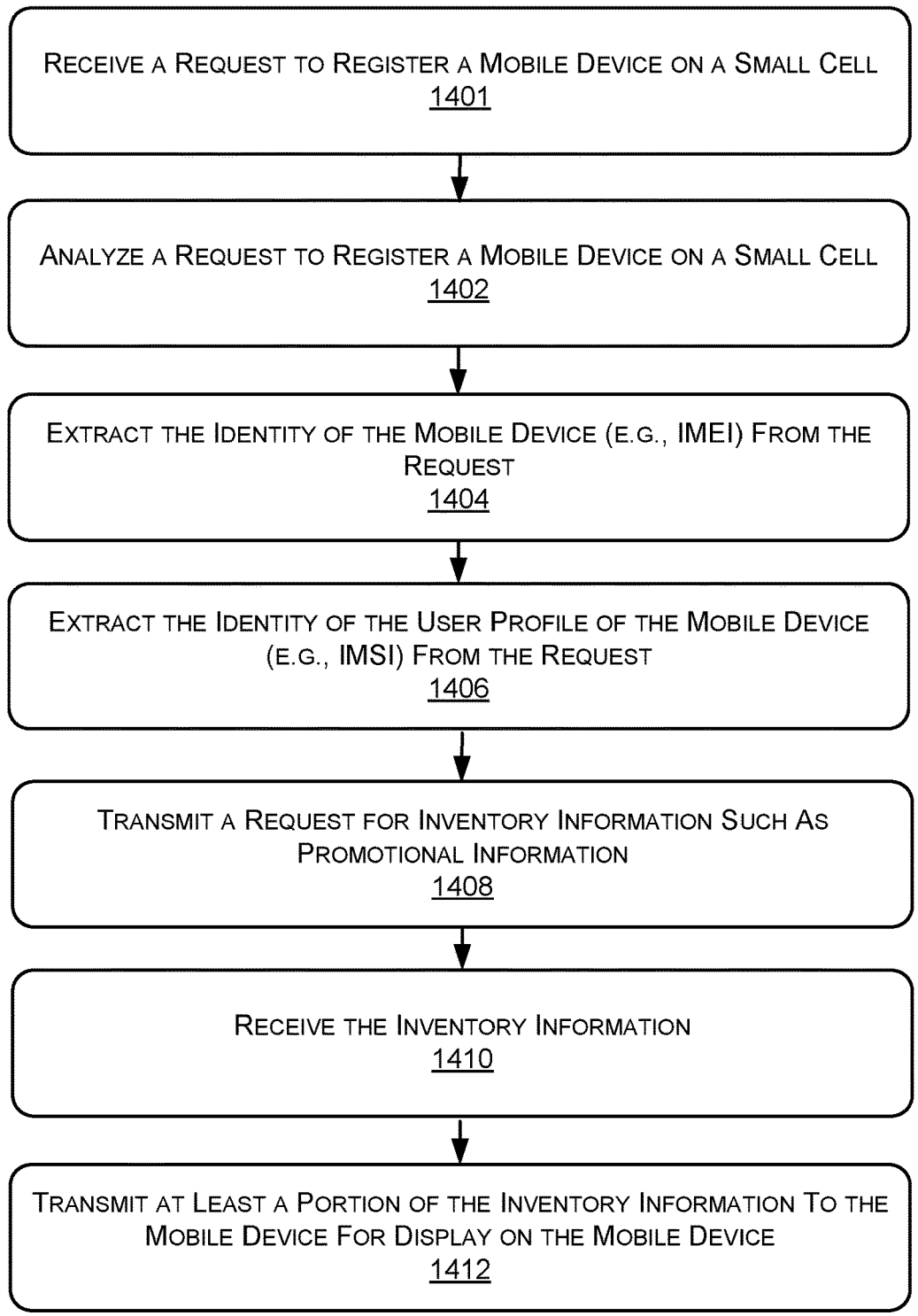
FIG. 14 illustrates operations performed by an example Proximal Customer Recognizer according to the disclosed systems and methods.

FIG. 14 depicts example operations performed by the small cell in accordance with the disclosed systems and methods. In an example, the operations may be included in an application stored on the small cell. In an example, the operations may be stored in a computer-readable memory of the small cell. At block 1401, a small cell receives a request to register a mobile device on a small cell. After receiving the request, the small cell analyzes the request to initiate the handover at block 1402. After analyzing the request, the small cell extracts the identity of the mobile device from the request at block 1404, and the small cell extracts an indication of the identity of the mobile device from the request at block 1406. One example of the identity of the mobile device is IMEI data, and one example of an indication of the identity of the user of the mobile device is IMSI data. At block 1408, the small cell transmits a request for promotional information. In one example, the small cell transmits the IMEI and IMSI data to the storefront computer system to obtain the promotional information. In an example, the small cell transmits a request that includes the IMEI and IMSI data to the carrier system to obtain customer information. The carrier system may query an HSS database with the IMSI and IMEI to retrieve customer information. In one example, the customer information includes an identity of the mobile device and an indication of the user of the mobile device. The customer information is received by the small cell, and included into a request to the storefront computer system to obtain inventory information. In response to the request for promotional information, the small cell receives the promotional information at block 1410. The small cell transmits at least a portion of the inventory information to the mobile device for display on the mobile device at block 1412.

Figure 15:
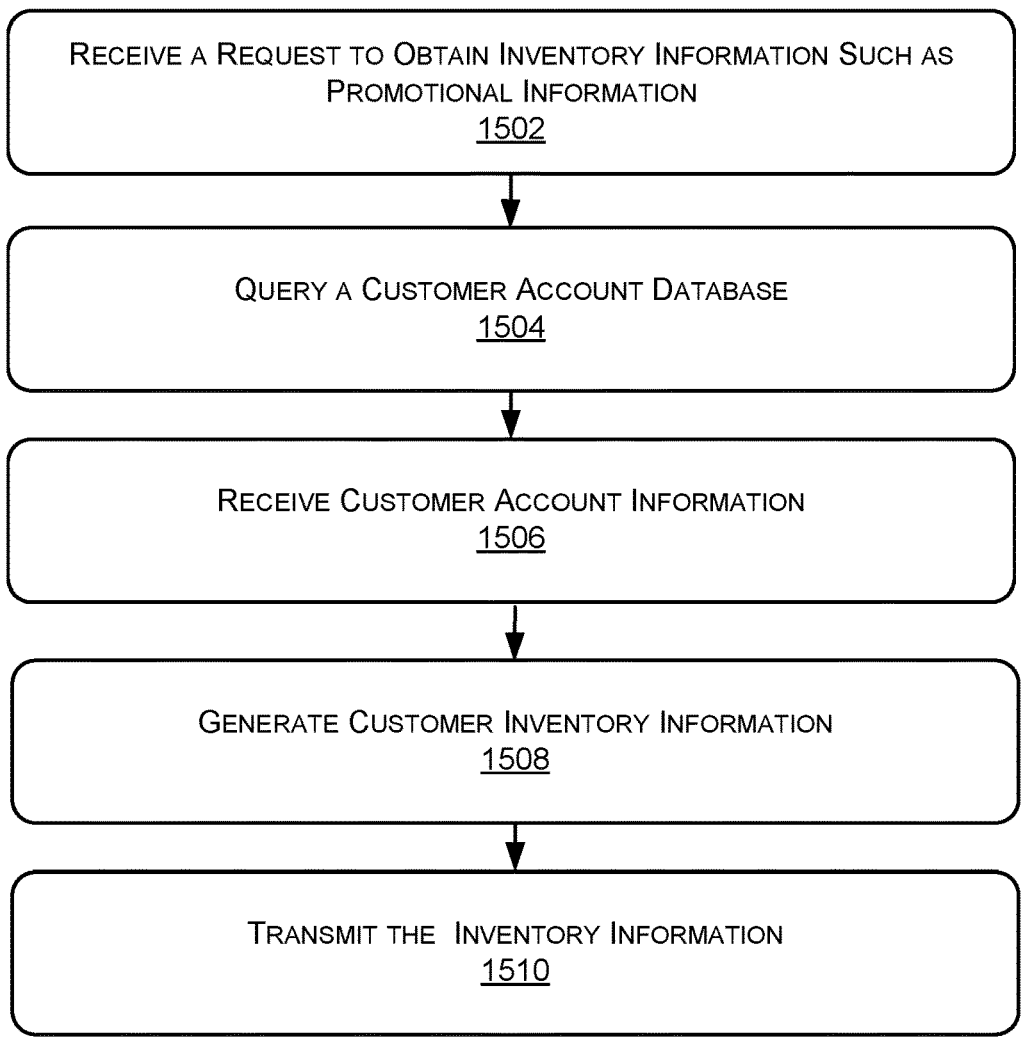
FIG. 15 illustrates operations performed by an example retail storefront computer system according to the disclosed systems and methods.

FIG. 15 depicts operations performed by a storefront computer system in accordance with the disclosed systems and methods. At block 1502, the storefront computer system receives a request to inventory information for distribution to a user of a user equipment. The request to obtain inventory information may include customer information. Example customer information includes an identification of the user equipment such as IMEI data and/or an indication of the identity of the user of the user equipment, such as IMEI data. The storefront queries its customer account database using the customer information to retrieve customer account information at block 1504. Example customer account information includes loyalty or membership identification, shopping preferences, transaction history, any pending reservations, any pending product purchases, and/or any pending service purchases. The retail storefront computer system receives the customer account information at block 1506. The storefront computer system generates inventory information, such as promotional information, at block 1508. In an example, the inventory information may be generated, based in part, on the customer account information. The inventory information may, in an example be generated based in part on the location of the user of the user equipment. In an example, the inventory information may be generated based in part on whether the user of the user equipment has been a past customer of storefront. The retail storefront computer system may provide different inventory information to users who have not been past customers of the storefront to create loyalty with the storefront. The retail storefront computer transmits the inventory information to the small cell at block 1510.

Figure 16:
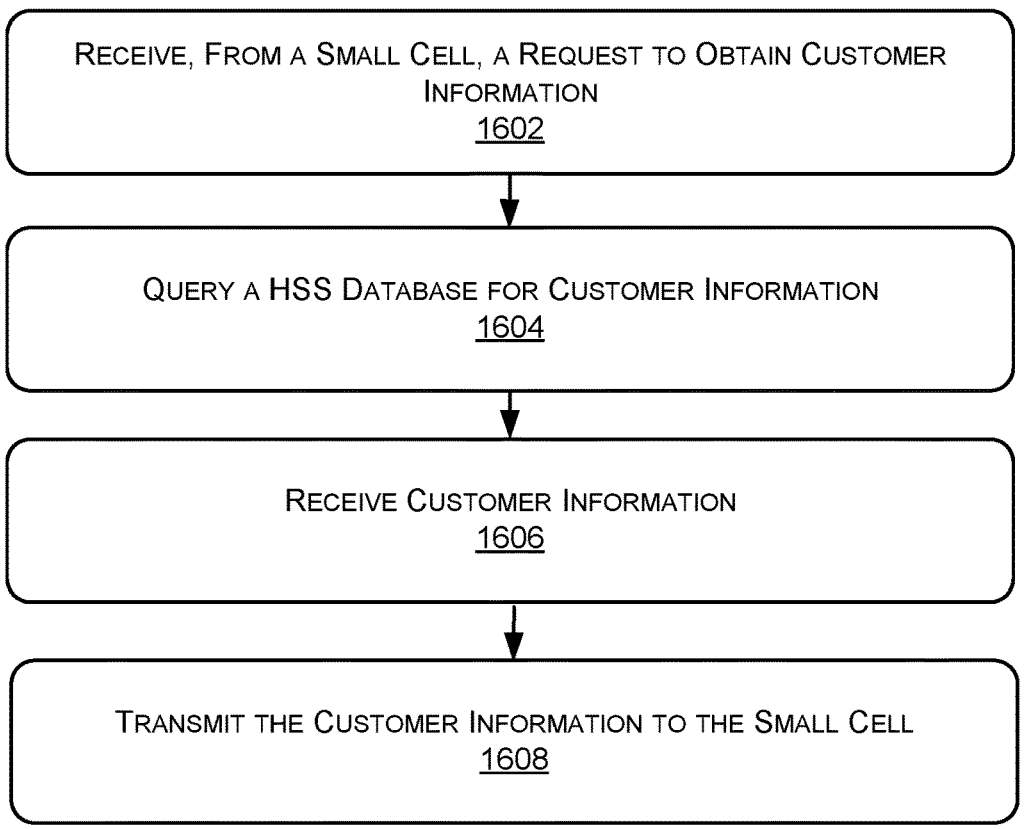
FIG. 16 illustrates operations performed by an example mobile carrier computer system according to the disclosed systems and methods.

FIG. 16 depicts example operations performed by the computer system of the mobile carrier according to the disclosed systems and methods. At block 1602, the mobile carrier computer system receives, from a small cell, a request to obtain customer information. In one example, the mobile carrier system may receive the request via a macrocell. For example, the small cell may transmit the request to the macrocell, which then forwards the request to the MME of EPC of the mobile carrier system. The MME then queries the HSS database for customer information. In an example, the mobile carrier system receives the request via a network. For example, the small cell may transmit a request to the PGW of the EPC of the mobile carrier system through a network. The PGW of the EPC forwards the request to the MME of the EPC. The MME of the EPC queries the HSS database for customer information. At block 1606, the MME of the EPC receives the customer information. The mobile carrier system transmits the customer information to the small cell at block 1608. The customer information may be transmitted to the small cell via a macrocell or a network coupled to the PGW.

In another example, the Proximal Customer Recognizer may be incorporated within a kiosk, vending machine, or other site that provides information, or articles of commerce such as goods and/or services. For example, a small cell or femtocell access point according to the disclosed systems and methods may be placed in a kiosk to identify users of user equipment. In this case, as a user with a user equipment enters within the radio range of the small cell or femtocell access point, the small cell or femtocell access point obtains customer information based on the IMEI and IMSI of the user equipment. The customer information may be used to generate customer account information for the user. The customer information may be used to identify inventory information for presentation to the user equipment of the user. In a vending machine, the customer information may be used to identify inventory items for purchase by the user. The customer information may also be used to generate customer account information for purchasing, billing and/or shipping purposes.

In still another example, the disclosed systems and methods may be used to automatically identify users entering controlled locations such as international borders or secure buildings. The disclosed systems and methods may also be used to identify and/or facilitate security protocols, including airport security and passenger boarding in airports, train stations, shipyards, and other modes of transportations.

In an example, the disclosed systems and methods may be used to transfer information to a user equipment for informational purposes. For example, a small cell according to the disclosed systems and methods may be placed in a kiosk located in museums, parks, and other locations to provide information to visitors or clients. In this case, as a small cell detects a user device, the small cell may transfer relevant information to the user device such as information relating to a museum exhibit the user of the user device is currently viewing. In other examples, a small cell may be placed in a specific location in a consumer store such as a grocery store or electronic store to provide relevant information to users who are located within the proximity of the small cell.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method for providing information to a mobile device, the method comprising:
    analyzing a first request to initiate a handover of the mobile device from a macrocell to a small cell, the first request to initiate the handover including an identity of the mobile device and an indication of an identity of a user profile associated with the mobile device;
    transmitting, via a wireless network, a second request for inventory information, the second request for the inventory information including user information associated with the user profile of the mobile device;
    receiving, in response to the second request and via the wireless network, the inventory information; and
    transmitting, at least partly in response to initiating the handover, at least a portion of the inventory information to the mobile device for display on the mobile device;
    wherein the inventory information corresponds to a retail entity device.

2. The method of claim 1, wherein analyzing the first request to initiate the handover of the mobile device comprises:
    extracting the identity of the mobile device from the first request to initiate the handover; and
    extracting the indication of the identity of the user profile associated with the mobile device from the first request to initiate the handover.

3. The method of claim 1, wherein the second request for the inventory information includes the identity of the user profile.

4. The method of claim 1, wherein the second request for the inventory information includes an indication of the identity of the mobile device.

5. A system for determining a presence of a mobile device, the system comprising:
    one or more processors; and
    a memory storing instructions that, when executed, cause the one or more processors to:
        receive a first request to register the mobile device on a small cell, the first request to register the mobile device including an identity of the mobile device and an indication of a user profile associated with the mobile device;
        extract the identity of the mobile device from the first request to register the mobile device;
        extract the indication of the user profile associated with the mobile device from the first request to register the mobile device;
        determine that a retail entity is associated with the small cell;
        transmit, in response to receiving the first request, via a wireless network, and to a computing device associated with the retail entity, a second request for information relating to inventory corresponding to the retail entity, the second request being based at least partly on the user profile; and
        transmit at least a portion of the information to the mobile device for display on the mobile device.

6. The system of claim 5, wherein the memory further comprises instructions that, when executed, cause the one or more processors to:
    transmit a third request for user information to a mobile carrier associated with the user profile, the third request for the user information including the identity of the mobile device and the indication of the user profile associated with the mobile device; and
    receive, from the mobile carrier, the user information associated with the user profile associated with the mobile device;
    wherein the first request for information includes at least a portion of the user information associated with the user profile associated with the mobile device.

7. The system of claim 6, wherein transmitting the third request for user information to the mobile carrier associated with the user profile comprises:
 transmitting the third request for the user information to a macrocell of the mobile carrier.

8. The system of claim 6, wherein transmitting the third request for user information to the mobile carrier associated with the user profile comprises:
 transmitting the third request for user information to an evolved packet core (EPC) of the mobile carrier.

9. A system for providing information to a small cell, the system comprising:
 one or more processors; and
 memory storing instructions that, when executed, cause the one or more processors to:
  receive, from the small cell, a request for information, the request including an identity of a mobile device and an indication of an identity of a user profile associated with the mobile device;
  query, using at least the identity of the mobile device and the indication of the identity of the user profile associated with the mobile device, a customer account database;
  receive customer account information in response to the query;
  generate, based on the customer account information received in response to the query, inventory information of a retail entity; and
  transmit, via a wireless network and in response to the request for information, at least a portion of the inventory information to the small cell.

10. The system of claim 9, wherein the identity of the mobile device is an International Mobile Equipment Identity (IMEI).

11. The system of claim 9, wherein the indication of the identity of the user profile associated with the mobile device is an International Mobile Subscriber Identity (IMSI).

12. The system of claim 9, wherein the customer account information includes at least one of a name, address, phone number, birthday, email account, voice, data plan, payment history, device model, device status, or device usage.

13. A system comprising:
 one or more processors; and
 memory storing instructions that, when executed, cause the one or more processors to:
  determine that a mobile device is within a predetermined proximity of a small cell associated with a consumer retail entity device and in communication with the consumer retail entity device via a wireless network;
  receive, from the small cell, a request to obtain customer information, the request to obtain customer information including an identity of the mobile device and an indication of an identity of a user profile associated with the mobile device;
  determine to obtain inventory information from the consumer retail entity device at least partly in response to receiving the request to obtain customer information;
  send, via the wireless network, a request for the inventory information to the consumer retail entity device;
  receive, via the wireless network, the inventory information from the consumer retail entity device;
  query, using at least the identity of the mobile device and the indication of the identity of the user profile associated with the mobile device, a home subscriber server;
  receive customer information in response to the query; and
  transmit the customer information and the inventory information to the small cell.

14. The system of claim 13, wherein the indication of the identity of the user profile associated with the mobile device is an International Mobile Subscriber Identity (IMSI).

15. The system of claim 13, wherein the request to obtain customer information is received via a macrocell.

16. The system of claim 13, wherein the request to obtain customer information is received via an evolved packet core (EPC).

17. The system of claim 13, wherein the customer information includes at least one of a name, address, birthday, phone number, email account, voice/data plan, payment history, device model, device status, or device usage.

18. The method of claim 1, wherein the retail entity device is associated with a retail storefront and is a different device than the small cell.

19. The system of claim 13, wherein the consumer retail entity device is associated with a retail storefront and is a different device than the small cell.

20. The system of claim 19, wherein the consumer retail entity device comprises a backend database of the retail storefront storing information indicating whether the mobile device has previously visited the retail storefront.

* * * * *